(12) United States Patent
Park

(10) Patent No.: US 12,493,161 B2
(45) Date of Patent: *Dec. 9, 2025

(54) CAMERA MODULE

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,468

(22) Filed: May 28, 2024

(65) Prior Publication Data
US 2024/0310602 A1    Sep. 19, 2024

Related U.S. Application Data

(63) Continuation of application No. 17/805,667, filed on Jun. 6, 2022, now Pat. No. 12,025,850, which is a
(Continued)

(30) Foreign Application Priority Data

May 19, 2017 (KR) ........................ 10-2017-0062021

(51) Int. Cl.
G02B 7/04 (2021.01)
H02K 41/035 (2006.01)

(52) U.S. Cl.
CPC ........... *G02B 7/04* (2013.01); *H02K 41/0354* (2013.01)

(58) Field of Classification Search
CPC .... G02B 7/04; G02B 27/646; H02K 41/0354; H02K 33/18; G03B 2205/0007;
(Continued)

(56) References Cited

U.S. PATENT DOCUMENTS 9,769,389 B2 * 9/2017 Miller .................... H04N 23/45
9,774,787 B2 * 9/2017 Miller .................... H04N 23/62
(Continued)

FOREIGN PATENT DOCUMENTS

CN    104614836 A    5/2015
CN    105527777 A    4/2016
(Continued)

OTHER PUBLICATIONS

International Search Report in International Application No. PCT/KR2018/005698, filed May 18, 2018.
(Continued)

*Primary Examiner* — William R Alexander
(74) *Attorney, Agent, or Firm* — Saliwanchik, Lloyd & Eisenschenk

(57) ABSTRACT

The present embodiment relates to a camera module comprising a first lens driving device and a second lens driving device, wherein a first lateral surface of the first lens driving device faces a second lateral surface of the second lens driving device, a first housing comprises a first lateral part corresponding to the first lateral surface of the first lens driving device and a second lateral part disposed at the opposite side of the first lateral part, a first magnet comprises a first magnet unit disposed in in the first lateral part and a second magnet unit disposed in the second lateral part, each of the first magnet unit and the second magnet unit comprises an inner surface facing a first coil, an outer surface disposed at an opposite side of the inner surface, and both lateral surfaces connecting the inner surface and the outer surface, and the distance between the both lateral surfaces of the first magnet unit is shorter than the distance between the both lateral surfaces of the second magnet unit.

20 Claims, 18 Drawing Sheets

Related U.S. Application Data continuation of application No. 16/614,685, filed as application No. PCT/KR2018/005698 on May 18, 2018, now Pat. No. 11,378,769.

(58) Field of Classification Search
CPC .... G03B 2205/0069; G03B 2205/0046; G03B 3/10; G03B 5/00; G03B 30/00; G03B 19/22; G03B 17/12; H04N 23/45; H04N 23/54; H04N 23/687
USPC .......................................................... 359/824
See application file for complete search history.

(56) References Cited

U.S. PATENT DOCUMENTS

| | | | |
|---|---|---|---|
| 9,781,345 B1 * | 10/2017 | Miller | G02B 7/09 |
| 9,826,132 B2 | 11/2017 | Wang et al. | |
| 9,958,756 B2 | 5/2018 | Hu et al. | |
| 10,063,783 B2 | 8/2018 | Miller et al. | |
| 10,178,285 B2 | 1/2019 | Chen et al. | |
| 10,281,801 B2 | 5/2019 | Hu et al. | |
| 10,382,698 B2 | 8/2019 | Sharma et al. | |
| 10,516,826 B2 | 12/2019 | Miller et al. | |
| 10,649,314 B2 | 5/2020 | Hu et al. | |
| 10,656,365 B2 | 5/2020 | Hsu et al. | |
| 10,659,663 B2 | 5/2020 | Wang et al. | |
| 2011/0097062 A1 | 4/2011 | Tsuruta et al. | |
| 2016/0018720 A1 | 1/2016 | Bachar et al. | |
| 2016/0320584 A1 | 11/2016 | Lee et al. | |
| 2017/0038601 A1 | 2/2017 | Fan et al. | |
| 2017/0082823 A1 | 3/2017 | Hwang et al. | |
| 2017/0094181 A1 | 3/2017 | Miller et al. | |
| 2017/0094182 A1 | 3/2017 | Miller et al. | |
| 2018/0210317 A1 | 7/2018 | Hu et al. | |
| 2018/0295292 A1 | 10/2018 | Lee et al. | |
| 2021/0191234 A1 * | 6/2021 | Park | H04N 25/00 |

FOREIGN PATENT DOCUMENTS

| | | |
|---|---|---|
| CN | 103676402 B | 12/2016 |
| CN | 106357990 A | 1/2017 |
| CN | 106559611 A | 4/2017 |
| CN | 106686303 A | 5/2017 |
| JP | 2011-138027 A | 7/2011 |
| KR | 10-1064131 B1 | 9/2011 |
| KR | 10-1343197 B1 | 12/2013 |
| KR | 10-2015-0104703 A | 9/2015 |
| KR | 10-2016-0073763 A | 6/2016 |
| KR | 10-2016-0128651 A | 11/2016 |
| KR | 10-2017-0001988 A | 1/2017 |
| KR | 10-2017-0045552 A | 4/2017 |
| TW | M541586 U | 5/2017 |
| WO | 2016/156996 A1 | 10/2016 |
| WO | 2017/078364 A1 | 5/2017 |

OTHER PUBLICATIONS

Supplementary European Search Report dated Jan. 28, 2021 in European Application No. 18803016.7.
Office Action dated Mar. 12, 2021 in Chinese Application No. 201880032868.6.
Office Action dated Nov. 16, 2021 in U.S. Appl. No. 16/614,685.
Notice of Allowance dated Mar. 4, 2022 in U.S. Appl. No. 16/614,685.
Office Action dated Jan. 28, 2023 in Korean Application No. 10-2022-0047791.
European Search Report dated Aug. 28, 2023 in European Application No. 23175486.2.
Office Action dated Nov. 8, 2023 in Chinese Application No. 202210038202.X.
Office Action dated Nov. 3, 2023 in Chinese Application No. 202210038201.5.
Office Action dated Apr. 12, 2024 in Chinese Application No. 202210036741.X.
Office Action dated Nov. 15, 2023 in U.S. Appl. No. 17/805,667.
Otice of Allowance dated Feb. 26, 2024 in U.S. Appl. No. 17/805,667.

* cited by examiner

CAMERA MODULE

CROSS-REFERENCE TO RELATED APPLICATIONS

This application is a continuation of U.S. application Ser. No. 17/805,667, filed Jun. 6, 2022; which is a continuation of U.S. application Ser. No. 16/614,685, filed Nov. 18, 2019, now U.S. Pat. No. 11,378,769, issued Jul. 5, 2022; which is the U.S. national stage application of International Patent Application No. PCT/KR2018/005698, filed May 18, 2018, which claims the benefit under 35 U.S.C. § 119 of Korean Application No. 10-2017-0062021, filed May 19, 2017, the disclosures of each of which are incorporated herein by reference in their entirety.

TECHNICAL FIELD

The teachings in accordance with exemplary and non-limiting embodiments of this invention relate generally to a camera module.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals. A camera module is one of the representative items that capture a subject in a picture or a video. Meantime, recently, researches are being waged on dual camera modules in which two individual camera modules are adjacently disposed. However, when two individual camera modules are adjacently disposed, there arises a problem where magnet interference is mutually generated between two camera modules.

DETAILED DESCRIPTION OF THE INVENTION

Technical Subject

The present exemplary embodiment is to provide a camera module configured to minimize the magnetic force interference between two parallel-arranged lens driving devices.

Technical Solution

A camera module according to an exemplary embodiment of the present invention may comprise: a first lens driving device comprising a first housing, a first bobbin disposed in the first housing, a first coil disposed on the first bobbin, a first magnet disposed on the first housing and facing the first coil, a first circuit member comprising a second coil facing the first magnet and spaced apart from the first housing; and a second lens driving device comprising a second housing, a second bobbin disposed in the second housing, a third coil disposed on the second bobbin, a second magnet disposed on the second housing and facing the third coil, and a second circuit member comprising a fourth coil facing the second magnet and spaced apart from the second housing, wherein a first lateral surface of the first lens driving device faces a second lateral surface of the second lens driving device, wherein the first housing comprises a first lateral part corresponding to the first lateral surface of the first lens driving device and a second lateral part disposed at an opposite side of the first lateral part, wherein the first magnet comprises a first magnet unit disposed in the first lateral part and the second magnet unit disposed in the second lateral part, wherein each of the first magnet unit and the second magnet unit comprises an inner surface facing the first coil, an outer surface disposed at an opposite side of the inner surface, and both lateral surfaces connecting the inner surface and the outer surface, and wherein a distance between the both lateral surfaces of the first magnet unit is shorter than a distance between the both lateral surfaces of the second magnet unit.

The first lateral part of the first housing may be disposed with a dummy member having magnetism weaker than that of the first magnet unit or having non-magnetism.

A sum of a distance between both lateral surfaces of the dummy member and a distance between both lateral surfaces of the first magnet unit may be same as a distance between both lateral surfaces of the second magnet unit.

A sum of a mass of the dummy member and a mass of the first magnet unit may be same as a mass of the second magnet unit.

The first housing may further comprise a third lateral part and a fourth lateral part disposed between the first lateral part and the second lateral part, each mutually disposed opposite to the other, the first magnet may further comprise a third magnet unit disposed on the third lateral part and a fourth magnet unit disposed on the fourth lateral part, each of the third magnet unit and the fourth magnet unit may comprise an inner surface facing the first coil, an outer surface disposed at an opposite side of the inner surface of the third magnet unit and the fourth magnet unit, and both lateral surfaces connecting the inner surface of the third magnet unit and the fourth magnet unit and the outer surface of the third magnet unit and the fourth magnet unit, and a distance between the both lateral surfaces of the second magnet unit may be same as a distance between the both lateral surfaces of the fourth second magnet unit.

The first lens driving unit may further comprise a third magnet disposed on the first bobbin, and a first sensor disposed on the first housing and facing the third magnet, wherein the first sensor may be disposed between the first lateral part of the first housing and the third lateral part of the first housing, and the first magnet unit disposed on the first lateral part of the first housing may be more eccentric toward the fourth lateral part of the first housing than the third lateral part of the first housing.

The second housing may comprise a fifth lateral part corresponding to the second lateral surface of the second lens driving device and a sixth lateral part disposed at an opposite side of the fifth lateral part, the second magnet may comprises a fifth magnet unit disposed on the fifth lateral part and a sixth magnet unit disposed on the sixth lateral part, each of the fifth magnet unit and the sixth magnet unit may comprise an inner surface facing the third coil, an outer surface disposed at an opposite side of the inner surface of the fifth magnet unit and the sixth magnet unit, and both lateral surfaces connecting the inner surface of the fifth magnet unit and the sixth magnet unit and the outer surface of the fifth magnet unit and the sixth magnet unit, and a distance between the both lateral surfaces of the fifth magnet unit may be shorter than a distance between the both lateral surfaces of the sixth second magnet unit.

The first magnet unit and the fifth magnet unit may be formed with a plate shape and mutually disposed in parallel, and the first magnet unit may comprise an area non-overlapped with the fifth magnet unit toward a direction facing an optical axis of the second lens driving device from an optical axis of the first lens driving device.

The first magnet unit may be eccentrically disposed toward one side from the first lateral part of the first housing, and the fifth magnet unit is eccentrically disposed toward a direction opposite to the eccentric direction of the first magnet unit from the fifth lateral part of the second housing.

A camera module according to an exemplary embodiment of the present invention may comprise: a first lens driving device comprising a first housing, a first bobbin disposed in the first housing, a first coil disposed on the first bobbin, a first magnet disposed on the first housing and facing the first coil, a first circuit member comprising a second coil facing the first magnet and spaced apart from the first housing; and a second lens driving device comprising a second housing, a second bobbin disposed in the second housing, a third coil disposed on the second bobbin, a second magnet disposed on the second housing and facing the third coil, and a second circuit member comprising a fourth coil facing the second magnet and spaced apart from the second housing, wherein a first lateral surface of the first lens driving device faces a second lateral surface of the second lens driving device, wherein the first housing comprises a first lateral part corresponding to the first lateral surface of the first lens driving device and the second housing comprises a second lateral part corresponding to the second lateral surface of the second lens driving device, wherein the first magnet comprises a first magnet unit disposed in the first lateral part and the second magnet comprises a second magnet unit disposed in the second lateral part, and wherein the first magnet unit comprises an area non-overlapped with the second magnet unit toward a direction facing an optical axis of the second lens driving device from an optical axis of the first lens driving device.

Advantageous Effects

The magnetic force interference between two parallel-disposed lens driving devices may be minimized through the present exemplary embodiment of the present invention. Furthermore, a discrete distance between the two lens driving devices may be minimized through the present exemplary embodiment of the present invention.

BEST MODE

Figure 1:
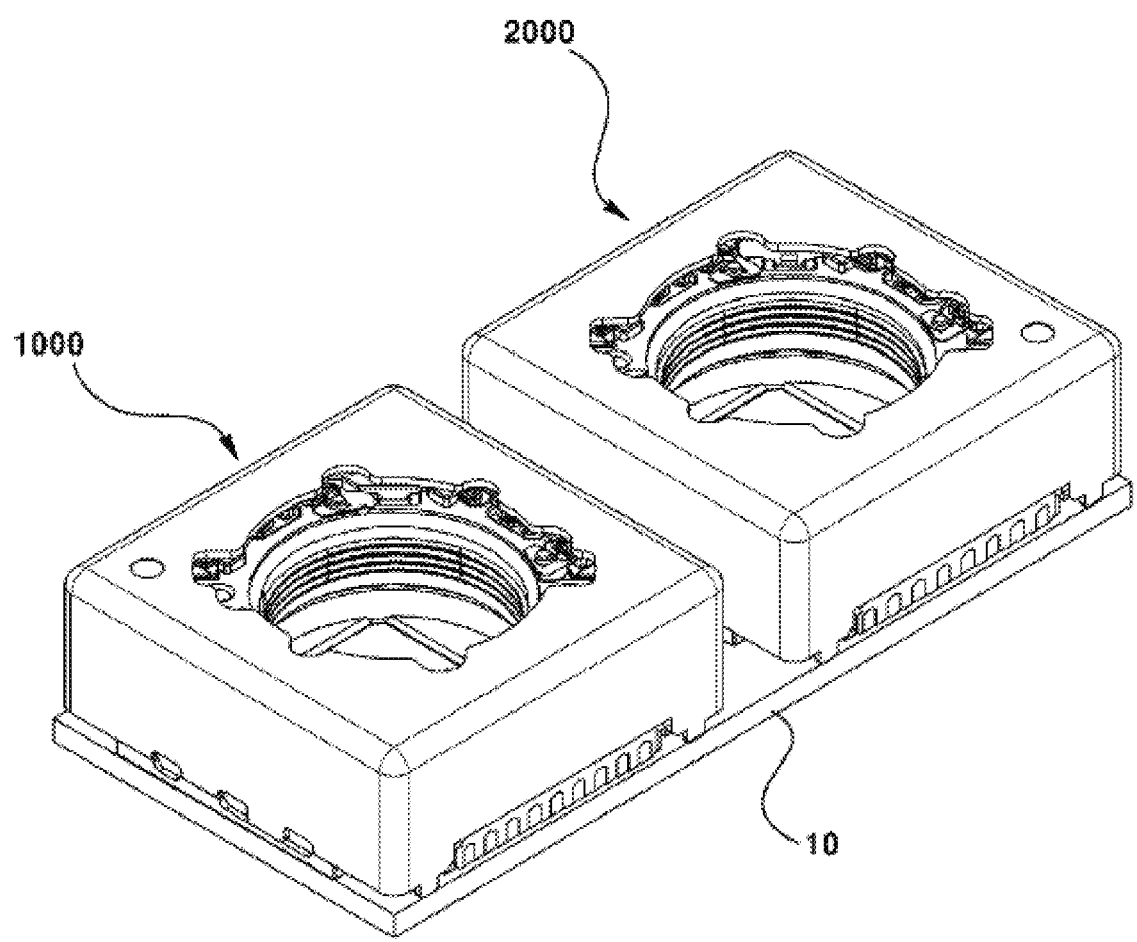
FIG. 1 is a perspective view of a camera module according to an exemplary embodiment of the present invention.

Some exemplary embodiments of present invention will be described in detail with reference to the accompanying drawings. However, it is not intended to limit the present invention to some of the described exemplary embodiments.

In describing elements in the exemplary embodiments of the present invention, the terms of first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

The hereinafter-used term of "optical axis direction" may be defined as an optical axis direction of a lens coupled to a lens drive device. Meantime, the "optical axis direction" may be interchangeably used with a vertical direction, a z axis direction and other directions.

The term of 'auto focus function' used hereinafter may be defined as a function of automatically matching a focus of a subject by adjusting a distance to an image sensor by moving a lens to an optical axis direction according to a distance to the subject in order to obtain a clear image of the subject on the image sensor. Meantime, the "auto focus" may be interchangeably used with an "AF (Auto Focus)".

The term of 'handshake correction function' used hereinafter may be defined as a function of moving or tilting a lens to a direction perpendicular to an optical axis in order to offset a vibration (movement) generated by an external force on the image sensor. Meantime, the 'handshake correction' may be interchangeably used with the 'OIS (Optical Image Stabilization)'.

The hereinafter-used term of a 'length' may include a concept of a 'distance'.

Hereinafter, a configuration of an optical instrument according to an exemplary embodiment of the present invention will be described.

The optical instrument may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and any device capable of capturing an image or a photograph may be an optical instrument.

The optical instrument may include a main body (not shown). The main body may form an external shape of an optical instrument. The main body may accommodate a camera module. One surface of a main body may be disposed with a display part. For example, one surface of main body may be disposed with a display part and a camera module, and the other surface of the main body (surface opposite to the said one surface) may be additionally disposed with a camera module.

The optical instrument may include a display part. The display part may be disposed on one surface of main body. The display part may output an image captured by the camera module.

The optical instrument may include a camera module. The camera module may be disposed on the main body. At least one element of the camera module may be accommodated into the main body. The camera module may be formed in a plural number. The camera module may be respectively disposed on one surface of the main body and on the other surface of the main body. The camera module may capture an image of a subject.

Hereinafter, configuration of a camera module according to an (a first exemplary) exemplary embodiment of the present invention will be described with reference to the accompanying drawings.

Figure 2:
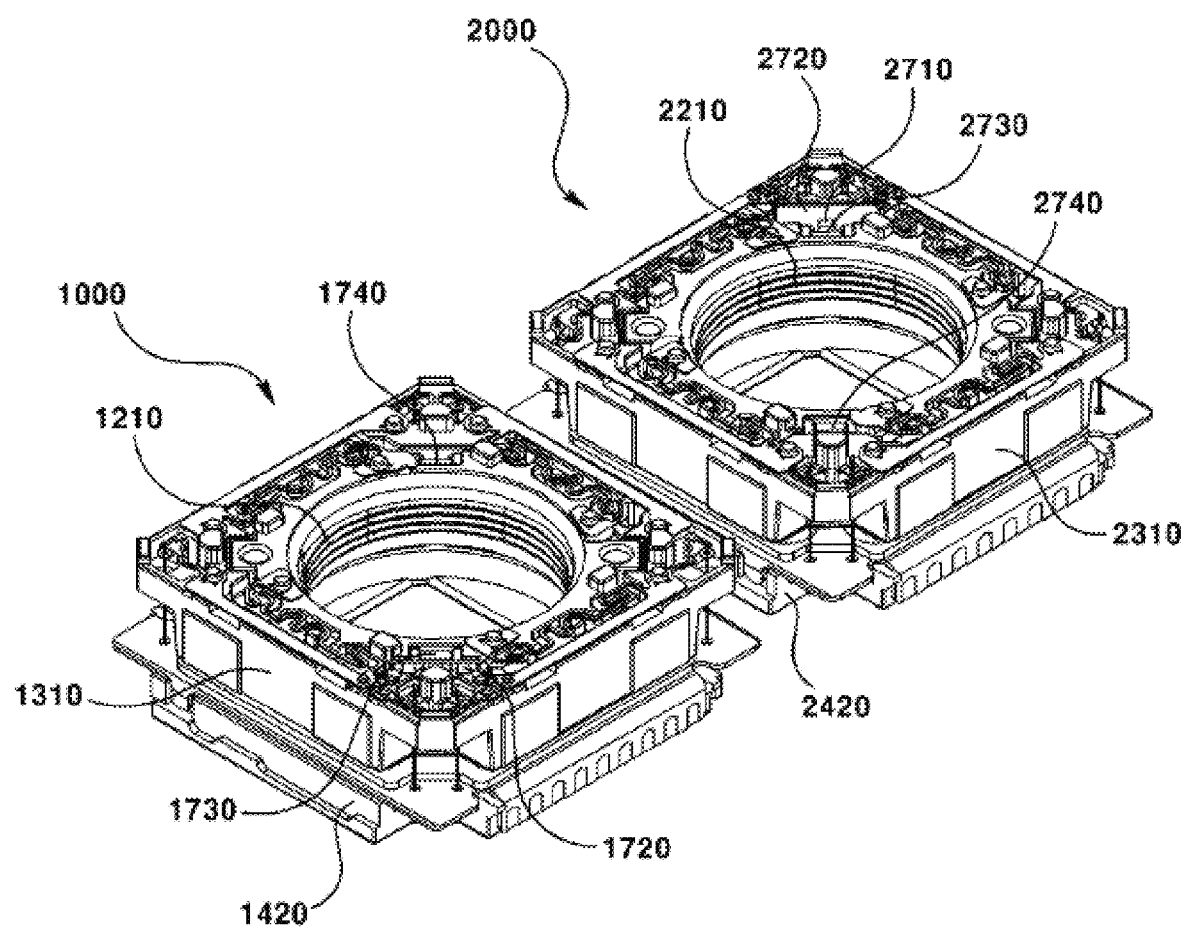
FIG. 2 is a perspective view of a camera module omitted of some elements according to an exemplary embodiment of the present invention.
Figure 17:
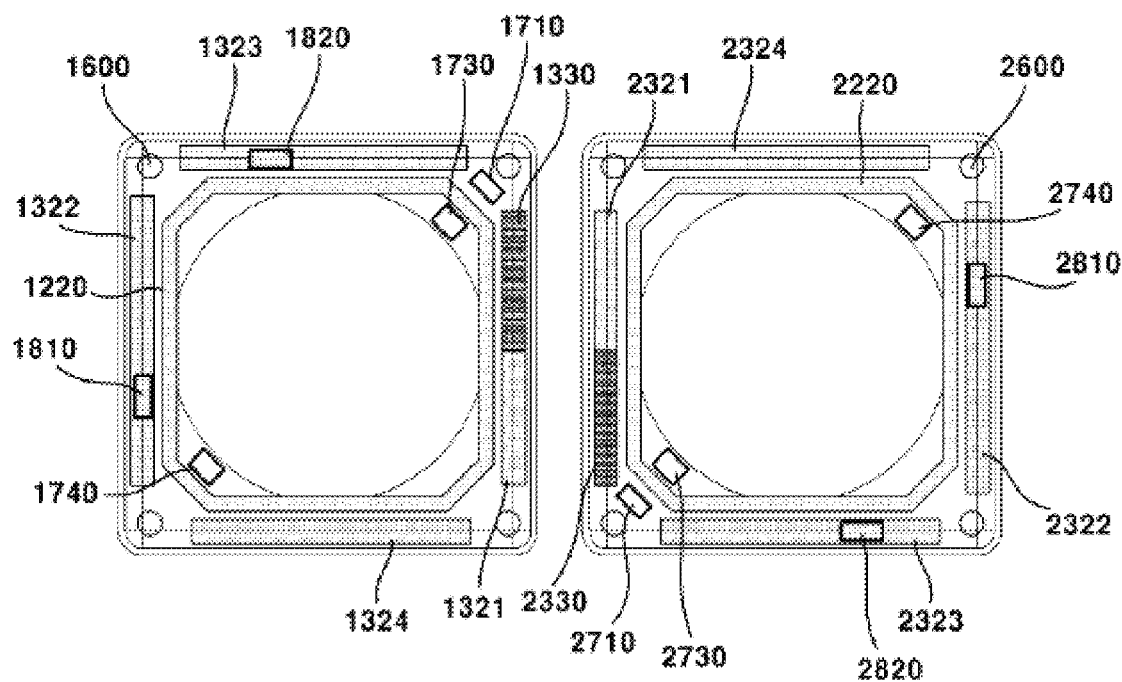
FIG. 17 is a perspective (conceptual) view of some elements of a dual camera module seen from a plane according to an exemplary embodiment of the present invention.

FIG. 1 is a perspective view of a camera module according to an exemplary embodiment of the present invention, FIG. 2 is a perspective view of a camera module omitted of some elements of the camera module according to an exemplary embodiment of the present invention, and FIG. 17 is a perspective (conceptual) view of some elements of a dual camera module seen from a plane according to an exemplary embodiment of the present invention.

The camera module may include a first camera module and a second camera module. In this case, the camera module may be called a 'dual camera module'. The camera module may include a dual lens driving device. That is, the camera module may include a first lens driving device (1000) and a second lens driving device (2000).

The first camera module may be an OIS camera module having an auto focus feedback function. The first camera module may be a camera module having all the auto focus function, the auto focus feedback function, the OIS function and the OIS feedback function. However, any one or more of the auto focus function, the auto focus feedback function, the OIS function and the OIS feedback function may be omitted from the first camera module.

The second camera module may be an OIS camera module having an auto focus feedback function. The second camera module may be a camera module having all the auto focus function, the auto focus feedback function, the OIS function and the OIS feedback function. However, any one or more of the auto focus function, the auto focus feedback function, the OIS function and the OIS feedback function may be omitted from the second camera module. The first camera module and the second camera module may be a same product.

The camera module may include a lens module. The lens module may include at least one lens. The lens module may include a lens and a lens barrel. The lens module may be coupled to a bobbin (1210, 2210) of a lens driving device (1000, 2000). The lens module may be coupled to the bobbin (1210, 2210) by way of screw-connection and/or an adhesive. The lens module may integrally move with the bobbin (1210, 2210). The lens module may include a first lens module coupled to the first bobbin (1210) of the first lens driving device (1000) and a second lens module coupled to the second bobbin (2210) of the second lens driving device (2000).

The camera module may include a filter. The filter may include an infrared filter. The infrared filter may shield a light of infrared region from being incident on an image sensor. The infrared filter may be interposed between the lens module and the image sensor. For example, the infrared filter may be disposed on a sensor base (not shown) interposed between the lens driving device (1000, 2000) and a PCB (10). In another example, the infrared filter may be disposed on a first base (1420, 2420). The filter may include a first filter correspondingly disposed with the first lens module and a second filter correspondingly disposed with the second lens module.

The camera module may include a PCB (Printed Circuit Board, 10). The PCB (10) may be disposed with the lens driving device (1000, 2000). At this time, a sensor base may be interposed between the PCB (10) and the lens driving device (1000, 2000). The PCB (10) may be electrically connected with the lens driving device (1000, 2000). The PCB (10) may be disposed with an image sensor. The PCB (10) may be electrically connected with the image sensor. The PCB (10) may be integrally formed. In a modification, the PCB (10) may include a first PCB correspondingly disposed with the first lens driving device (1000), and a second PCB correspondingly disposed with the second lens driving device (2000).

The camera module may include an image sensor. The image sensor may be disposed on the PCB (10). The image sensor may be electrically connected to the PCB (10). For example, the image sensor may be coupled to the PCB by way of SMT (Surface Mounting Technology) method. In another example, the image sensor may be coupled to the PCB by way of flip chip technology. The image sensor may be so disposed as to match a lens by way of optical axis. In other words, an optical axis of the image sensor and an optical axis of the lens may be aligned. The image sensor may convert a light irradiated on an effective image region to an electric signal. The image sensor may be a CCD (Charge Coupled Device), a MOS (Metal Oxide Semi-Conductor), a CPD and a CID. The image sensor may include a first image sensor correspondingly disposed with the first lens module and a second image sensor correspondingly disposed with the second lens module.

The camera module may include a controller. The controller may be disposed on the PCB (10). The controller may be mounted on the PCB (10). The controller may individually control a direction, intensity and an amplitude of a current supplied to a first coil (1220) and a second coil (1412*b*) of the lens driving device (1000, 2000). The controller may perform an AF function and/or an OIS function by controlling the lens driving device (1000, 2000). Furthermore, the controller may perform an AF feedback function and/or an OIS feedback function by controlling the lens driving device (1000, 2000).

Hereinafter, the configuration of a first lens driving device according to an exemplary embodiment will be described with reference to the accompanying drawings.

Figure 3:
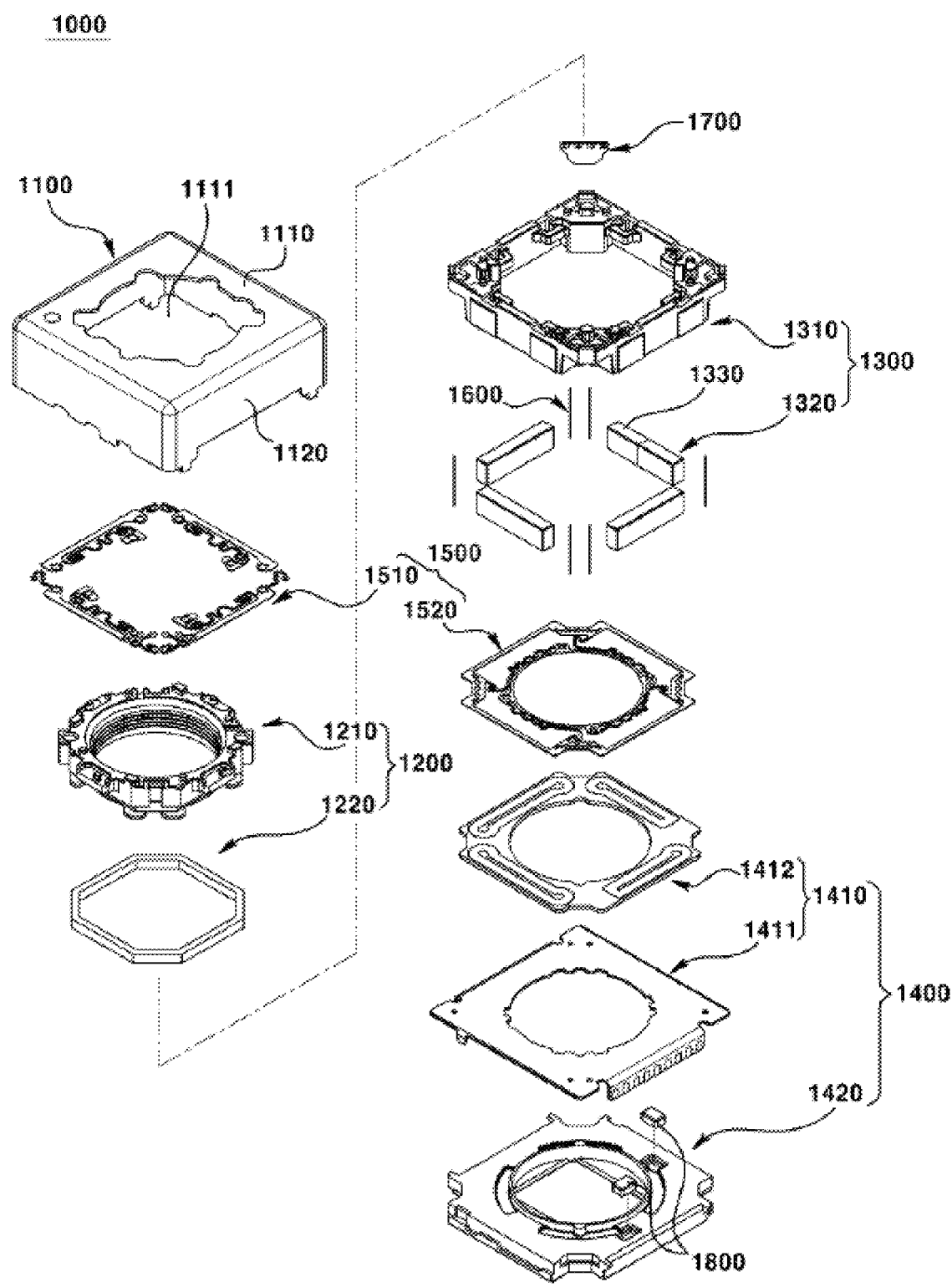
FIG. 3 is an exploded perspective view of a first lens driving device according to an exemplary embodiment of the present invention.
Figure 4:
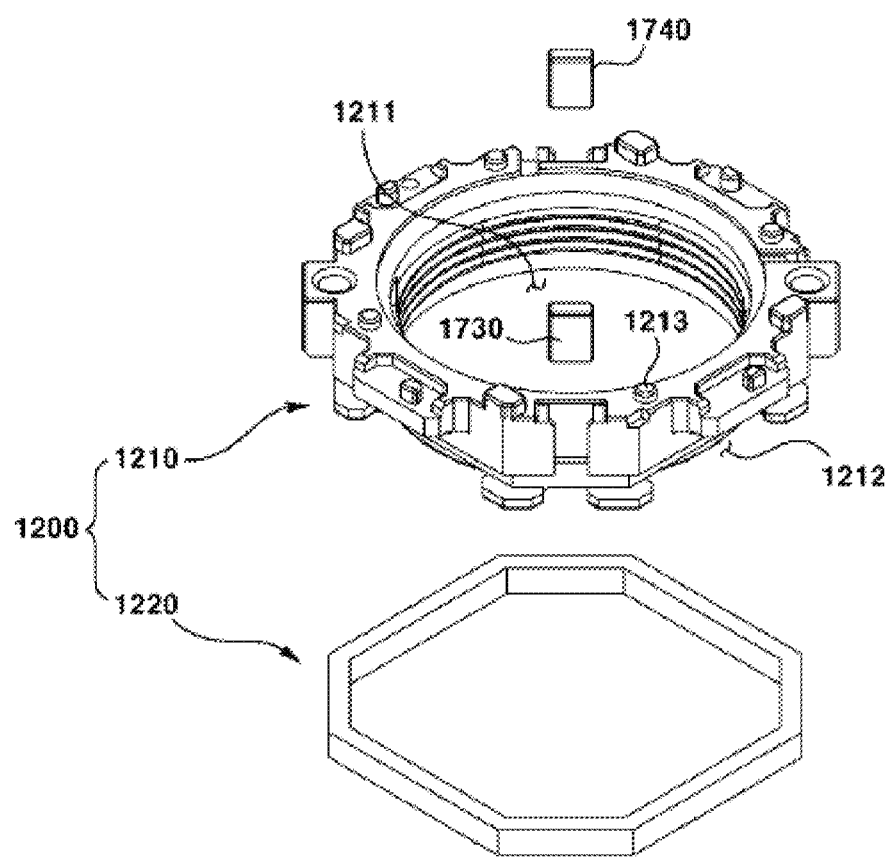
FIG. 4 is an exploded perspective view of a first AF mover and relevant elements according to an exemplary embodiment of the present invention.
Figure 5:
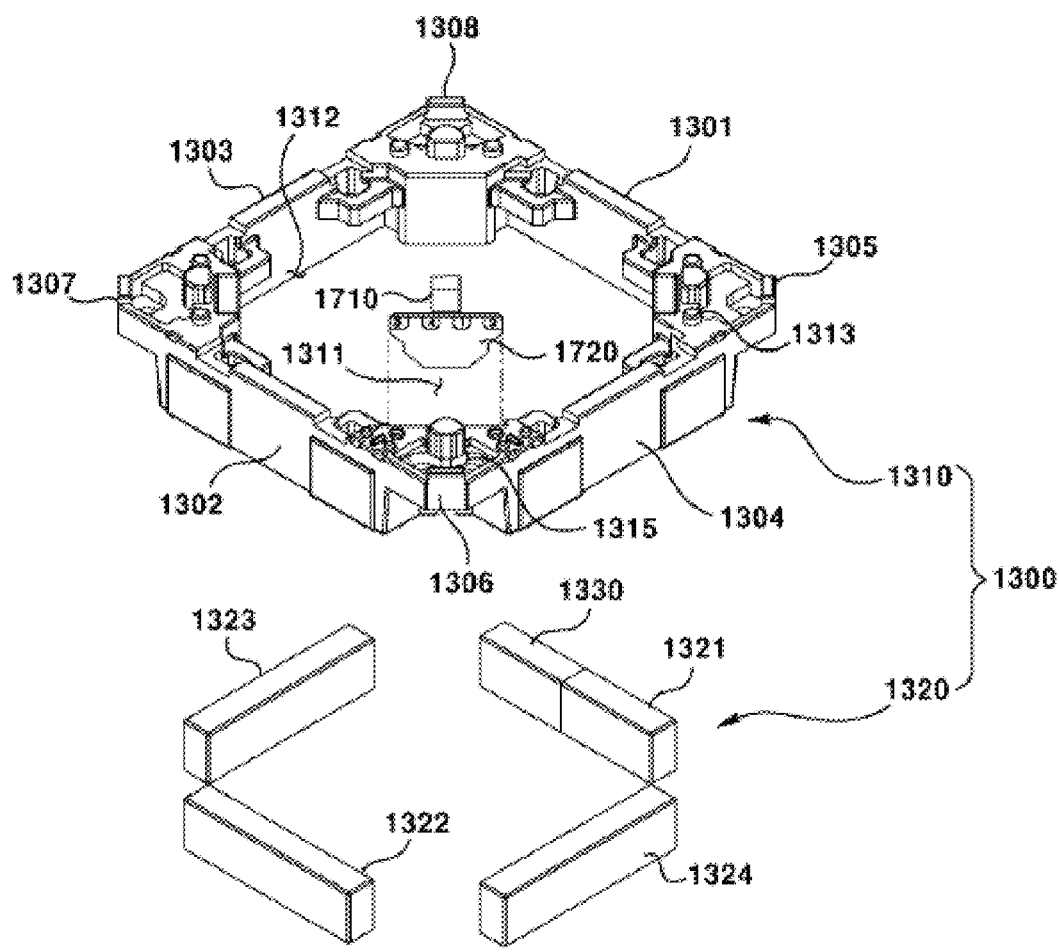
FIG. 5 is an exploded perspective view of a first OIS mover and relevant elements according to an exemplary embodiment of the present invention.
Figure 6:
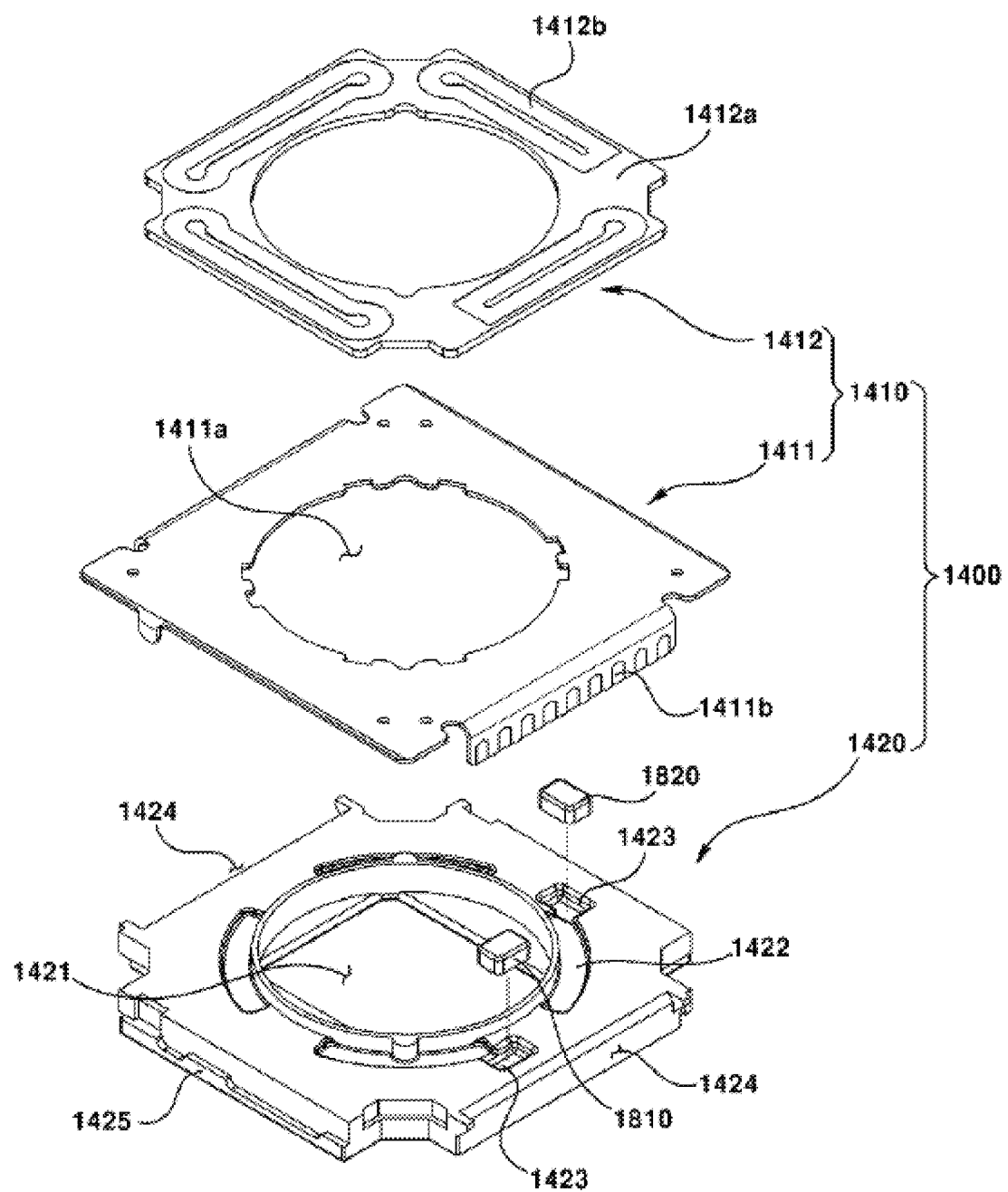
FIG. 6 is an exploded perspective view of a first stator and relevant elements according to an exemplary embodiment of the present invention.
Figure 7:
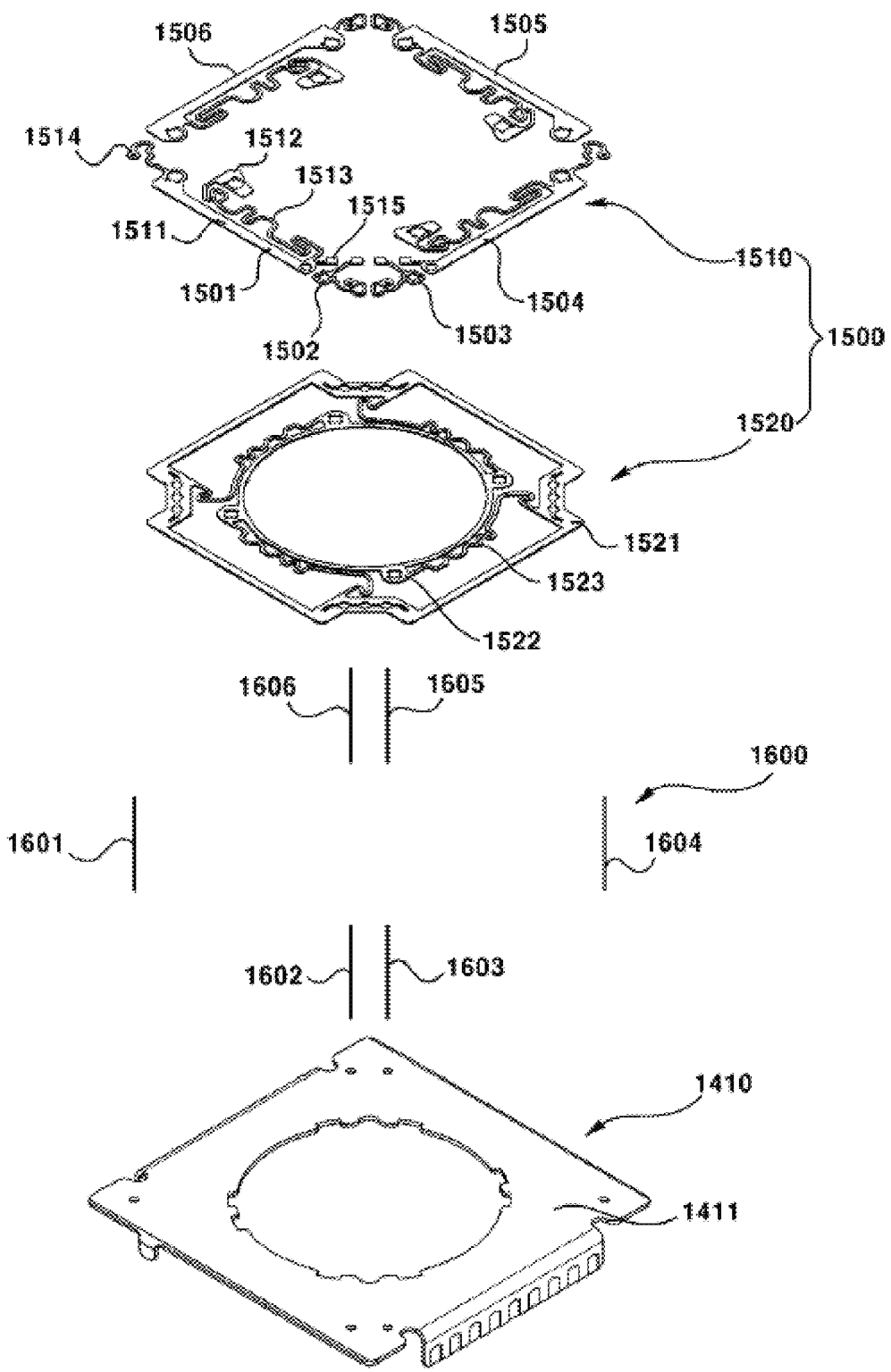
FIG. 7 is an exploded perspective view of a first elastic member, a first support member and relevant elements according to an exemplary embodiment of the present invention.
Figure 8:
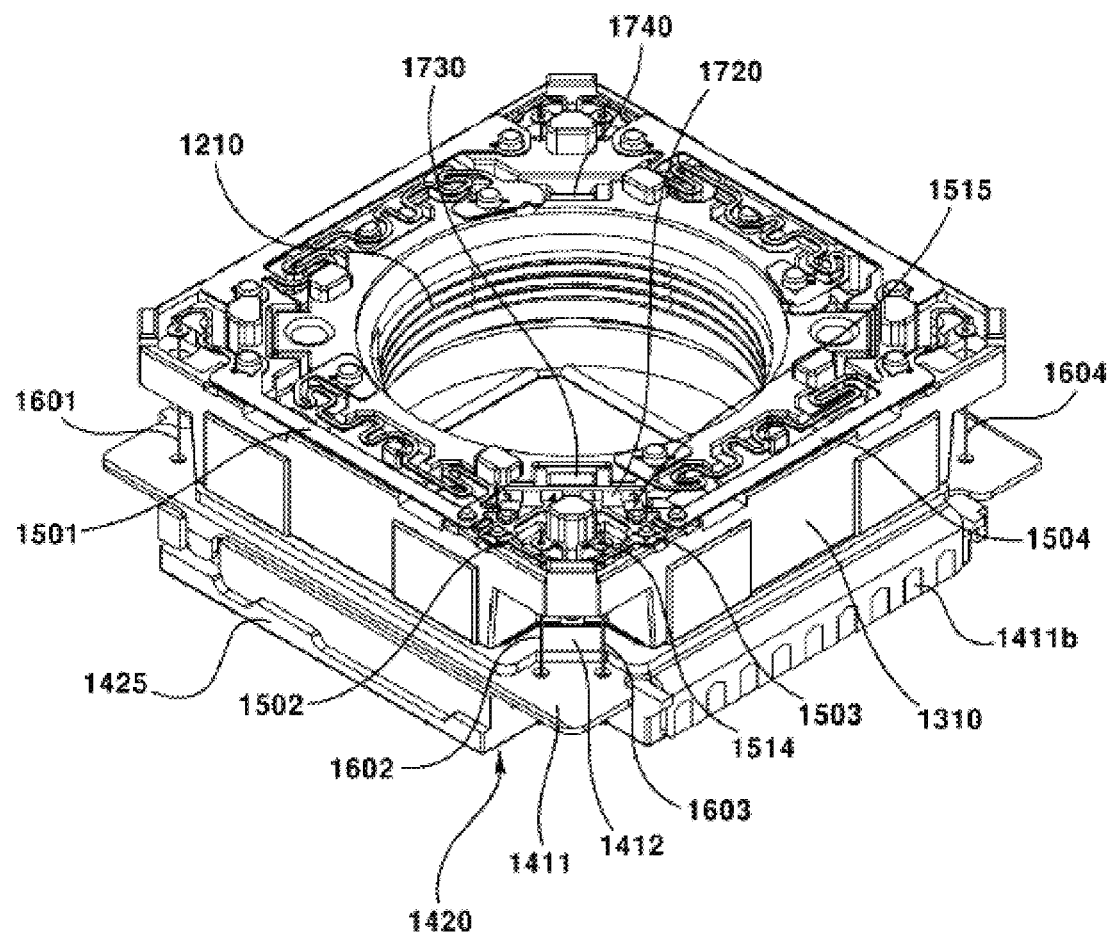
FIG. 8 is a perspective view of a first lens driving device omitted of some elements according to an exemplary embodiment of the present invention.
Figure 9:
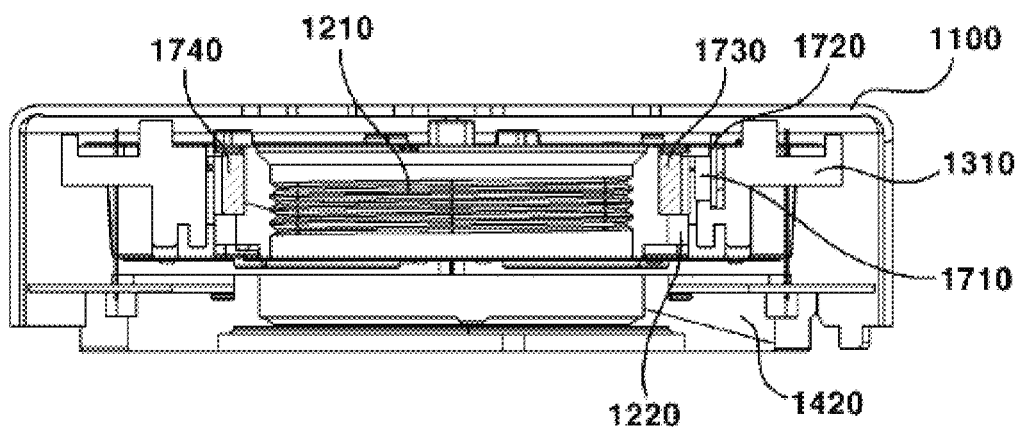
FIG. 9 is a cross-sectional view of a first lens driving device according to an exemplary embodiment of the present invention.

FIG. 3 is an exploded perspective view of a first lens driving device according to an exemplary embodiment of the present invention, FIG. 4 is an exploded perspective view of a first AF mover and relevant elements according to an exemplary embodiment of the present invention, FIG. 5 is an exploded perspective view of a first OIS mover and relevant elements according to an exemplary embodiment of the present invention, FIG. 6 is an exploded perspective view of a first stator and relevant elements according to an exemplary embodiment of the present invention, FIG. 7 is an exploded perspective view of a first elastic member, a first support member and relevant elements according to an exemplary embodiment of the present invention, FIG. 8 is a perspective view of a first lens driving device omitted of some elements according to an exemplary embodiment of the present invention, and FIG. 9 is a cross-sectional view of a first lens driving device according to an exemplary embodiment of the present invention.

The first lens driving device (1000) may be spaced apart from the second lens driving device (2000). The first lens driving device (1000) may be disposed in parallel with the second lens driving device (2000). The first lens driving device (1000) may be disposed side by side with the second lens driving device (2000). The first lens driving device (1000) may be so disposed as to be mutually parallel on a surface facing the second lens driving device (2000). A first lateral surface of the first lens driving device (1000) may face a second lateral surface of the second lens driving device (2000). The first lateral surface of a first cover (1100) of the first lens driving device (1000) may face a second lateral surface of a second cover (2100) of the second lens driving device (2000). The first lens driving device (1000) may be adjacently disposed with the second lens driving device (2000).

The first cover (1100) of the first lens driving device (1000) may be spaced apart within 1~5 mm from the second cover (2100) of the second lens driving device (2000) because the magnetic interference between the first lens driving device (1000) and the second lens driving device (2000) can be minimized through an arrangement structure of magnets in the present exemplary embodiment of the present invention. Furthermore, it is also possible to narrow the spaced-apart distance between the first lens driving device (1000) and the second lens driving device (2000) to within 1 mm. This shows a quite an improvement when compared with a case where a mutual magnetic interference is generated between the first lens driving device (1000) and the second lens driving device (2000) even if a spaced-apart distance is 9~10 mm to which no arrangement structure of magnets is applied as in the present exemplary embodiment of the present invention.

The first lens driving device (1000) may include a first housing (1310), a first bobbin (1210) disposed inside of the first housing (1310), a first coil (1220) disposed inside of the first bobbin (1210), a first magnet (1320) disposed on the first housing (1310) to face the first coil (1220), a second coil (1412*b*) facing the first magnet (1320), and a first circuit member (1410) so disposed as to be spaced apart from the first housing (1310) {e.g., underneath the first housing (1310)}. The first lens driving device (1000) may further include a first sensing magnet (hereinafter referred to as 'third magnet', 1730) disposed on the first bobbin (1210), and a first sensor (1710) disposed on the first housing (1310) to face the first sensing magnet (1730).

The first lens driving device (1000) may comprise a first cover (1100). The first cover (1100) may be accommodated at an inside of a first housing (1310). The first cover (1100) may form an external shape of the first lens driving device (1000). The first cover (1100) may take a bottom-opened cubic shape. The first cover (1100) may be of a non-magnetic substance. The first cover (1100) may be formed with a metal material. To be more specific, the first cover (1100) may be formed with a metal plate. In this case, the first cover (1100) may shield an EMI (Electro Magnetic Interference). Because of the said characteristic of the first cover (1100), the first cover (1100) may be called an "EMI shield can". The first cover (1100) can shield radio waves generated from outside of the first lens driving device (1000) from being introduced into the first cover (1100). Furthermore, the first cover (1100) can shield radio waves generated from inside of the first cover (1100) from being discharged to outside of the first cover (1100).

The first cover (1100) may include an upper plate (1110) and a side plate (1120). The first cover (1100) may include an upper plate (1110) and a side plate (1120) downwardly extended from an edge of the upper plate (1110). A portion of the side plate (1120) at the first cover (1100) may be coupled to a first base (1420). The lower end of the side plate (1120) of the first cover (1100) may be coupled to a step (staircase, 1425) of the first base (1420). An inner lateral surface of the side plate (1120) of the first cover (1100) may be coupled to an outside lateral surface of the first base (1420) by an adhesive (not shown). An inner space formed by the first cover (1100) and the first base (1420) may be disposed with a first AF mover (1200) and a first OIS mover (1300). Through this structure, the first cover (1100) can protect inner elements from an outside shock and simultaneously inhibit an outside foreign contaminated object from being inwardly introduced. In a modification, the lower end of the side plate (1120) of the first cover (1100) may be directly coupled with the PCB (10). One of the plurality of side plates (1120) may face a second cover (2100).

The upper plate (1110) of first cover (1100) may include a hole (1111). The hole (1111) may be formed on the upper plate (1110). The hole (1111) may expose the first lens module. The hole (1111) may be formed with a shape corresponding to that of the first lens module. The size of the hole (1111) may be formed to be greater than a diameter of the first lens module to allow the first lens module to be assembled through the hole (1111). Meantime, a light having been introduced through the hole (1111) may pass through the first lens module. At this time, the light having passed the first lens module may be converted to an electric signal by a first image sensor and may be obtained as an image.

The first lens driving device (1000) may include a first AF mover (1200). The first AF mover (1200) may be coupled with a first lens module. The first AF mover (1200) may be accommodated into an inside of the first lens module. An inner periphery surface of first AF mover (1200) may be coupled by an outer periphery surface of the first lens module. The first AF mover (1200) may be moved through interaction with the first OIS mover (1300) and/or a first the stator (1400). At this time, the first AF mover (1200) may move integrally with the first lens module. The first AF mover (1200) may move for AF focus function. Furthermore, the first AF mover (1200) may move for the OIS function.

The first AF mover (1200) may include a first bobbin (1210). The first bobbin (1210) may be disposed at an inside of a first housing (1310). The first bobbin (1210) may be disposed on a hole (1311) of the first housing (1310). The first bobbin (1210) may move to an optical axis direction relative to the first housing (1310). The first bobbin (1210) may be coupled with the first lens module. An inner periphery surface of the first bobbin (1210) may be coupled by an outer periphery surface of the first lens module. The first bobbin (1210) may be coupled by a first coil (1220). An outer periphery surface of the first bobbin (1210) may be coupled by the first coil (1220). An upper surface of the first bobbin (1210) may be coupled by a first upper elastic member (1510). A lower surface of the first bobbin (1210) may be coupled by a first lower elastic member (1520).

The first bobbin (1210) may include a hole (1211), The hole (1211) may be disposed at an inside of the first bobbin (1210). The hole (1211) may be so formed as to be opened at an upper side and a bottom side. The hole (1211) may be coupled by a first lens module. An inner periphery surface of the hole (1211) may be formed with a screw thread corresponding to that formed on an outer periphery surface of the first lens module. The first lens module may be screw-connected with the first bobbin (1210). The first lens module may be coupled the first bobbin (1210) using an adhesive. At this time, the adhesive may be an epoxy hardened by any one or more of UV, heat and laser.

The first bobbin (1210) may include a driving part coupling part (1212). The driving part coupling part (1212) may be coupled by a first coil (1220). The driving part coupling part (1212) may be formed on an outer periphery surface of the first bobbin (1210). The driving part coupling part (1212) may be formed by a groove formed by allowing a portion of the outer periphery surface of the first bobbin (1210) to be inwardly recessed. The first bobbin (1210) may include an upper coupling part (1213). The upper coupling part (1213) may be coupled with the first upper elastic member (1510). The upper coupling part (1213) may be coupled to an inner part (1512) of the first upper elastic member (1510). The upper coupling part (1213) may include a lug protruding from an upper surface of the first bobbin (1210). The lug of the upper coupling part (1213) may be coupled to a groove or a hole of the inner part (1512) of the first upper elastic member (1510). At this time, the lug of the upper coupling part (1213) may be fused while being inserted into the hole of the inner part (1512) to allow the first upper elastic member (1510) to be fixed between the fused lug and an upper surface of the first bobbin (1210). In a modification, the upper coupling part (1212) may include a groove. In this case, an adhesive may be disposed on the groove of the upper coupling part (1212) to allow the first upper elastic member (1510) to be fixed.

The first bobbin (1210) may include a lower coupling part. The lower coupling part may be coupled with the first lower elastic member (1520). The lower coupling part may be coupled with an inner part (1522) of the first lower elastic member (1520). The lower coupling part may include a lug protruding from a lower surface of the first bobbin (1210). For example, the lug of the lower coupling part may be coupled into a groove or a hole of the inner part (1522) of the first lower elastic member (1520). At this time, the lug of the lower coupling part may be fused while being inserted into the hole of the inner part (1512) to allow the first lower elastic member (1520) to be fixed between the fused lug and a lower surface of the first bobbin (1210). In a modification, the lower coupling part may include a groove. In this case, an adhesive may be disposed on the groove of the lower coupling part to allow the first lower elastic member (1520) to be fixed.

The first AF mover (1200) may include a first coil (1220). The first coil (1220) may be disposed on the first bobbin (1210). The first coil (1220) may be disposed on an outer periphery surface of the first bobbin (1210). The first coil (1220) may be directly wound on the first bobbin (1210). Alternatively, the first coil (1220) may be disposed on the first bobbin (1210) while being directly wound on the first bobbin (1210). The first coil (1220) may face the first magnet (1320). In this case, when a current is supplied to the first coil (1220) to form a magnetic field about the first coil (1220), the first coil (1220) may be moved relative to the first magnet (1320) in response to an electromagnetic interaction between the first coil (1220) and the first magnet (1320). The first coil (1220) may electromagnetically interact with the first magnet (1320). The first coil (1220) may move the first bobbin (1210) relative to the first housing (1210) to an optical axis direction through the electromagnetic interaction with the first magnet (1320). At this time, the first coil (1220) may be called an 'AF coil'. The first coil (1220) may be integrally formed.

The first coil (1220) may include a pair of lead cables for power supply. At this time, the pair of lead cables of the first coil (1220) may be electrically connected to fifth and sixth upper elastic units (1505, 1506), which are elements of the first upper elastic member (1510). That is, the first coil (1220) may receive a power through the first upper elastic member (1510). To be more specific, the first coil (1220) may receive a power sequentially through a PCB (10), a first upper elastic member (1410), a first support member (1600) and a first upper elastic member (1510). Alternatively, the first coil (1220) may receive a power from a first lower elastic member (1520).

The first lens driving device (1000) may include a first OIS mover (1300). The first OIS mover (1300) may accommodate, at an inside, at least a portion of a first AF mover (1200). The first OIS mover (1300) may move the first AF mover (1200) or may move with the first AF mover (1200). The first OIS mover (1300) may be moved through the interaction with the first stator (1400). The first OIS mover (1300) may be moved for OIS function. At this time, the first OIS mover (1300) may be integrally moved with the first AF mover (1200) for the OIS function.

The first OIS mover (1300) may include a first housing (1310). The first housing (1310) may be disposed at an outside of the first bobbin (1210). The first housing (1310) may accommodate, at an inside thereof, at least a portion of the first bobbin (1210). The first housing (1310) may be disposed with a first magnet (1320). An outer periphery surface of the first housing (1310) may take a shape corresponding to that of an inner periphery surface of a side plate (1120) of the first cover (1100). The first housing (1310) may be formed with an insulation material. The first housing (1310) may be formed with a material different from that of the first cover (1100). An outer lateral surface of the first housing (1310) may be spaced apart from an inner surface of the side plate (1120) of the first cover (1100). The first housing (1310) may move in a discrete space between the first housing (1310) and the first cover (1100) for OIS driving. An upper surface of the first housing (1310) may be coupled by the first upper elastic member (1510). A lower surface of first housing (1310) may be coupled by a first lower elastic member (1520).

The first housing (1310) may include four lateral parts and four corner parts disposed among the four lateral parts. The first housing (1310) may include first to fourth lateral parts (1301, 1302, 1303, 1304). The first housing (1310) may include first to fourth corner parts (1305, 1306, 1307, 1308). The first housing (1310) may include first to fourth corner parts (1305, 1306, 1307, 1308) disposed among the first to fourth lateral parts (1301, 1302, 1303, 1304). The first housing (1310) may include a first lateral part (1301) corresponding to a first lateral surface of the first lens driving device (1000), and a second lateral part (1302) disposed opposite to the first lateral part (1301). The first housing (1310) may include a third lateral part (1303) and a fourth lateral part (1304) that are disposed between the first lateral part (1301) and the second lateral part (1302) and that are mutually oppositely disposed.

The first housing (1310) may include a hole (1311). The hole (1311) may be formed on the first housing (1310). The hole (1311) may be formed at an inside of the first housing (1310). The hole (1311) may be so formed as to vertically pass through the first housing (1310). The hole (1311) may be formed with a first bobbin (1210). The hole (1311) may be movably disposed with the first bobbin (1210). The hole (1311) may be partially formed with a shape corresponding to that of the first bobbin (1210). An inner periphery surface of the first housing (1310) forming the hole (1311) may be spaced apart from an outer periphery surface of the first bobbin (1210). However, an inner surface of the first housing (1310) forming the hole (1311) may be disposed with a stopper inwardly protruded to mechanically restrict the movement of the first bobbin (1210) to an optical axis direction.

The first housing (1310) may include a driving part coupling part (1312). The driving part coupling part (1312) may be coupled by a first magnet (1320). The driving part coupling part (1312) may be formed on an inner periphery surface of the first housing (1310). In this case, it is advantageous for the first magnet (1320) disposed on the driving part coupling part (1312) to electromagnetically interact with the first coil (1220) disposed on an inside of the first magnet (1320). The driving part coupling part (1312) may take a bottom-opened shape. In this case, the first magnet (1320) disposed on the driving part coupling part (1312) may have an advantageous electromagnetic interaction with the second coil (1412b) disposed at a lower side of the first magnet (1320). The driving part coupling part (1312) may be formed as a groove formed on an inner periphery surface of the first housing (1310). For example, the driving part coupling part (1312) may be formed on a lateral part of the first housing (1310). In another example, the driving part coupling part (1312) may be formed on a corner part of the first housing (1310).

The first housing (1310) may include an upper coupling part (1313). The upper coupling part (1313) may be coupled with the first upper elastic member (1510). The upper coupling part (1313) may be coupled with the outer part (1511) of the first upper elastic member (1510). The upper coupling part (1313) may include a lug protrusively and upwardly formed from an upper surface of the first housing (1310). For example, the lug on the upper coupling part (1313) may be coupled to a groove or a hole of the outer part (1511) of the first upper elastic member (1510). At this time, the lug of the upper coupling part (1313) may be fused while being inserted into a hole of an outer part (1511) to allow the first upper elastic member (1510) to be fixed between the fused lug and an upper surface of the first housing (1310). In a modification, the upper coupling part (1313) may include a groove. In this case, an adhesive may be disposed on the groove of the upper coupling part (1313) to allow the first upper elastic member (1510) to be fixed.

The first housing (1310) may include a lower coupling part (not shown). The lower coupling part may be coupled to the first lower elastic member (1520). The lower coupling part may be coupled with the outer part (1521) of the first lower elastic member (1520). The lower coupling part may include a lug protrusively and downwardly formed from a lower surface of the first housing (1310). For example, the lug on the lower coupling part may be coupled to a groove or a hole of the outer part (1521) of the first lower elastic member (1520). At this time, the lug of the lower coupling part may be fused while being inserted into a hole of the outer part (1521) to allow the first lower elastic member (1520) to be fixed between the fused lug and a lower surface of the first housing (1310). In a modification, the lower coupling part may include a groove. In this case, an adhesive may be disposed on the groove of the lower coupling part to allow the first lower elastic member (1520) to be fixed.

The first housing (1310) may include a sensor coupling part (1315). The sensor coupling part (1315) may be disposed with at least a portion of the first sensor unit (1700). The sensor coupling part (1315) may be disposed with a first sensor (1710). The sensor coupling part (1315) may be formed on the first housing (1310). The sensor coupling part (1315) may include a groove formed by allowing a portion of the upper surface of the first housing (1310) to be recessed. At this time, the sensor coupling part (1315) may be accommodated by at least a portion of the first sensor (1710). Furthermore, at least a portion of the sensor coupling part (1315) may be formed with a shape corresponding to that of the first sensor (1710).

The first OIS mover (1300) may include a first magnet (1320). The first magnet (1320) may be disposed on the first housing (1310). The first magnet (1320) may be disposed outside of the first coil (1220). The first magnet (1320) may face the first coil (1220). The first magnet (1320) may electromagnetically interact with the first coil (1220). The first magnet (1320) may be disposed above the second coil (1412b).

The first magnet (1320) may face the second coil (1412b). The first magnet (1320) may electromagnetically interact with the second coil (1412b). The first magnet (1320) may be commonly used for AF function and the OIS function. The first magnet (1320) may be disposed at a lateral part of the first housing (1310). At this time, the first magnet (1320) may be a flat plated magnet. The first magnet (1320) may take a shape of a flat plate. In a modification, the first magnet (1320) may be disposed on a corner part of first housing (1310). At this time, the first magnet (1320) may be a corner magnet. The first magnet (1320) may take a cubic shape having a greater inner lateral surface than an outer lateral surface.

At least a portion of the first magnet (1320) may be disposed at an area lower than the first sensor (1710). An entire of the first magnet (1320) may be disposed at an area lower than the first sensor (1710). A portion of the first magnet (1320) may be disposed underneath the first sensor (1710) and the remaining portion of the first magnet (1320) may be disposed on a same height as that of the first sensor (1710). That is, a portion of the first magnet (1320) may be overlapped with the first sensor (1710) to a horizontal direction. The first magnet (1320) may be disposed at an area lower than the first sensing magnet (1730). The first magnet (1320) may be disposed at an area lower than a first compensation magnet (1740).

The first magnet (1320) may include each-spaced-apart first to fourth magnet units (1321, 1322, 1323, 1324). The first magnet (1320) may include a first magnet unit (1321) disposed at a first lateral part (1301) of first housing (1310). The first magnet (1320) may include a second magnet unit (1322) disposed at a second lateral part (1302) of first housing (1310). The first magnet (1320) may include a third magnet unit (1323) disposed at a third lateral part (1303) of first housing (1310). The first magnet (1320) may include a fourth magnet unit (1324) disposed at a fourth lateral part (1304) of first housing (1310).

The first magnet (1320) may include a first magnet unit (1321) disposed on the first lateral part (1301) of first housing (1310), and a second magnet unit (1322) disposed on the second lateral part (1302) of the first housing (1310). Each of the first magnet unit (1321) and the second magnet unit (1322) may include an inner surface facing the first coil (1220), an outer surface disposed opposite to the inner surface and both lateral surfaces connecting the inner surface and the outer surface. At this time, a distance between both lateral surfaces of the first magnet unit (1321) may be shorter than a distance between both lateral surfaces of the second magnet unit (1322). That is, a crosswise length of the inner surface of the first magnet unit (1321) may be shorter than a crosswise length of the inner surface of the second magnet unit (1322). However, a lengthwise length of the inner surface of the first magnet unit (1321) may be same as a lengthwise length of the inner surface of the second magnet unit (1322).

A distance between both lateral surfaces of first magnet unit (1321) may be 50% of a distance between the both lateral surfaces of the second magnet unit (1322). Alternatively, a distance between both lateral surfaces of the first magnet unit (1321) may be 40% to 60% of a distance between the both lateral surfaces of the second magnet unit (1322). Alternatively, a distance between both lateral surfaces of the first magnet unit (1321) may be 30% to 70% of a distance between the both lateral surfaces of the second magnet unit (1322).

The first magnet unit (1321) may be smaller in size than the second magnet unit (1322). A volume of the first magnet unit (1321) may be smaller than that of the second magnet unit (1322). A surface area of the first magnet unit (1321) may be smaller than that of the second magnet unit (1322). As a result, the magnetic field interference affected by the first magnet (1320) to the second lens driving device (2000) can be minimized by arranging the smaller-sized first magnet unit (1321) near to the second lens driving device (2000).

The first magnet unit (1321) disposed on the first lateral part (1301) of the first housing (1310) may be more eccentrically disposed toward the fourth lateral part (1304) of the first housing (1310) than the third lateral part (1303) of the first housing (1310). At this time, the first sensor (1710) facing the first sensing magnet (1730) may be interposed between the first lateral part (1301) of the first housing (1310) and the third lateral part (1303) of the first housing (1310). That is, the first magnet unit (1321) may be so eccentrically disposed as to be spaced apart from the first sensor (1710).

The first magnet unit (1321) may be disposed on the first lateral part (1301) of the first housing (1310) by being leaned toward a corner part of one side. The first magnet unit (1321) may be eccentrically disposed toward one side. An eccentric direction of the first magnet unit (1321) may be opposite from that of a fifth magnet unit (2321) of the facing second lens driving device (2000). The first magnet unit (1321) may be eccentrically disposed toward one side from the first lateral part (1301) of the first housing (1310), and the fifth magnet unit (2321) may be eccentrically disposed toward an opposite direction of the eccentric direction of the first magnet unit (1321) from a fifth lateral part (2301) of second housing (2310), through which an overlapped area between the first magnet unit (1321) and the fifth magnet unit (2321) may be minimized. In the said structure, the magnetic field interference between the first magnet unit (1321) and the fifth magnet unit (2321) may be minimized.

The first magnet unit (1321) may include an area that is not overlapped with the fifth magnet unit (2321) of the second magnet (2320) of the second lens driving device (2000) from an optical axis of the first lens driving device (1000) toward an optical axis of the second lens driving device (2000). At this time, the first magnet unit (1321) and the fifth magnet unit (2321) may be formed with a flat plated shape and mutually parallel disposed. Furthermore, the first magnet unit (1321) may not be overlapped with the fifth magnet unit (2321) of the second magnet (2320) of the second lens driving device (2000) from an optical axis of the first lens driving device (1000) toward an optical axis of the second lens driving device (2000). As mentioned above, through the said structure, the magnetic field interference between the first magnet unit (1321) and the fifth magnet unit (2321) may be minimized.

The first magnet (1320) may include a third magnet unit (1323) disposed on the third lateral part (1303) of first housing (1310), and a fourth magnet unit (1324) disposed on the fourth lateral part (1304) of the first housing (1310). Each of the third magnet unit (1323) and the fourth magnet unit (1324) may include an inner surface facing the first coil (1220), an outer surface disposed opposite to the inner surfaces of the third magnet unit (1323) and the fourth magnet unit (1324) and both lateral surfaces connecting the inner surfaces of the third magnet unit (1323) and the fourth magnet unit (1324) and the outer surfaces of the third magnet unit (1323) and the fourth magnet unit (1324). A distance between both lateral surfaces of the second magnet unit (1322) may be same as a distance between both lateral surfaces of the third magnet unit (1323) and a distance between the both lateral surfaces of fourth magnet unit (1324).

A distance between both lateral surfaces of second magnet unit (1322), a distance between both lateral surfaces of the third magnet unit (1323) and a distance between both lateral surfaces of fourth magnet unit (1324) may be all the same. At this time, the thickness and height of the second magnet unit (1322), the third magnet unit (1323) and the fourth magnet unit (1324) may be all the same. That is, the second magnet unit (1322), the third magnet unit (1323) and the fourth magnet unit (1324) may have the same shape and size. However, the first magnet unit (1321) may be formed to be smaller in size than the second magnet unit (1322), the third magnet unit (1323) and the fourth magnet unit (1324). In this case, the sensitivity to X axis direction and Y axis direction during OIS driving may be different because of difference in magnetic force among the first to fourth magnet units (1321, 1322, 1323, 1324), which can be corrected by controlling a value of a current applied from a driver IC of the controller to each of the coil unit of the second coil (1412*b*). Alternatively, this can be corrected by differing the number of windings wound on each coil unit of the second coil (1412*b*).

A length of major axis (horizontal length) of inner surface at the first magnet unit (1321) may be shorter than a length of major axis of inner surface of the second to fourth magnet unit (1322, 1323, 1324). A length of minor axis of inner surface (vertical length) of first magnet unit (1321) may be same as a length of minor axis of inner surface of the second to fourth magnet units (1322, 1323, 1324). A thickness of first magnet unit (1321) may be same as that of second to fourth magnet units (1322, 1323, 1324).

The first lens driving device (1000) may include a dummy member (1330). The first lateral part (1301) of first housing (1310) may be formed with a dummy member (1330) having a weaker magnetism than the first magnet unit (1321) or may be formed with a dummy member (1330) having a non-magnetism. The magnetism of the dummy member (1330) may be weak or may have no magnetism. In the present exemplary embodiment, there may be generated an imbalance of weight because the first magnet unit (1321) is smaller in size and weight compared with other magnet units, which may be a factor generating a tilt of the first housing (1310). As a result, the dummy member (1330) that corrects the weight imbalance may be disposed to thereby solve the said weight imbalance.

The dummy member (1330) may be disposed to adjust a center of weight of the first magnet (1320). To be more specific, the dummy member (1330) may be disposed in order to solve the imbalance generated when the weight of the first magnet unit (1321) is different from the weight of other magnet units. A sum of mass of dummy member (1330) and a mass of the first magnet unit (1321) may be the same as the mass of the second magnet unit (1322). A center of dummy member (1330), the first magnet unit (1321) and the second magnet unit (1322) may be disposed on a central axis of the first housing (1310). Furthermore, a center of weight of the dummy member (1330 and the first to fourth magnet units (1321, 1322, 1323, 1324) may be disposed on a central axis of the first housing (1310). Through the said structure, the tilt generated from the first housing (1310) due to weight imbalance of the first magnet (1320) can be inhibited.

The dummy member (1330) may be disposed on the side of the first magnet unit (1321). The dummy member (1330) may be disposed adjacent to the first magnet unit (1321). The dummy member (1330) may be so disposed as to contact the first magnet unit (1321). The dummy member (1330) may be disposed to be extended to a lengthwise direction from the first magnet unit (1321). A sum of a distance between both lateral surfaces of dummy member (1330) and a distance between both lateral surfaces of the first magnet unit (1321) may be same as a distance between both lateral surfaces of the second magnet unit (1322). That is, compared with the second magnet unit (1322), the dummy member (1330) may be formed with a size corresponding to an area omitted with the first magnet unit (1321). The dummy member (1330) may have a height same as that of the first magnet unit (1321). The dummy member (1330) may have a thickness same as that of the first magnet unit (1321). The dummy member (1330) may have a width same as that of the first magnet unit (1321). At this time, the height of the dummy member (1330) may be a length to a lengthwise direction (short side direction, vertical direction) of inner surface of dummy member (1330), and a width of the dummy member (1330) may be a length of crosswise direction (major side direction, horizontal direction) of inner surface of the dummy member (1330). The thickness of dummy member (1330) may be a distance between an inner surface and an outer surface of the dummy member (1330). In a modification, any one or more of the height, thickness and width of the dummy member (1330) may be different from those of the first magnet unit (1321).

The dummy member (1330) may be disposed on the first lateral part (1301) of the first housing (1310) to be leaned toward a corner part of the other side {a corner part of opposite side of a corner part disposed adjacently disposed by the first magnet (1321)}. The dummy member (1330) may be eccentrically disposed to the other side. The eccentric direction of the dummy member (1330) may be opposite to an eccentric direction of the first magnet unit (1321). Thus, the eccentric direction of dummy member (1330) may match the eccentric direction of the fifth magnet unit (2321), through which an overlapped area between the dummy member (1330) and the fifth magnet unit (2321) may be maximized. The said structure can minimize the magnetic field interference between the first magnet unit (1321) and the fifth magnet unit (2321).

The first lens driving device (1000) may include a first stator (1400). The first stator (1400) may be disposed underneath the first housing (1310). The first stator (1400) may be disposed underneath the first OIS mover (1300). The first stator (1400) may face the first OIS mover (1300). The first stator (1400) may movably support the first OIS mover (1300). The first stator (1400) can move the first OIS mover (1300). At this time, the first AF mover (1200) may also move along with the first OIS mover (1300).

The first stator (1400) may include a first circuit member (1410). The first circuit member (1410) may be coupled with the first support member (1600). The first circuit member (1410) can supply a current to the first coil (1220). The first circuit member (1410) can supply a current to the first coil (1220) through the first support member (1600) and the first upper elastic member (1510). The first circuit member (1410) can supply a current to a board (1720) of the first sensor unit (1700) through the first support member and the first upper elastic member (1510). The current supplied to the board (1720) may be used for driving of the first sensor (1710).

The first circuit member (1410) may include a first board (1411). The first board (1411) can supply a power to the second coil (1412*b*). The first board (1411) may be coupled with a coil member (1412). The first board (1411) may be coupled with a PCB (10) disposed underneath the first base (1420). The first board (1411) may be disposed on an upper surface of first base (1420). The first board (1411) may be disposed underneath a lower surface of coil member (1412). The first board (1411) may be interposed between the coil member (1412) and the first base (1420). The first board (1411) may be coupled with the first support member (1600). The first board (1411) may be formed with a hole passed through by the first support member (1600). A lower surface of the first board (1411) and a lower end of the first support member (1600) may be coupled by a soldering. The first board (1411) may include an FPCB (Flexible Printed Circuit Board). The first board (1411) may be partially bent.

The first board (1411) may include a hole (1411*a*). The hole (1411*a*) may be formed on the first board (1411). The hole (1411*a*) may be formed at a center of the first board (1411). The hole (1411*a*) may be so formed as to pass through the first board (1411). The hole (1411a) may pass through a light having passed the first lens module. The hole (1411a) may be formed with a round shape.

The first board (1411) may include a terminal part (1411b). The terminal part (1411b) may be formed on the first board (1411). The terminal part (1411b) may be formed by allowing a portion of the first board (1411) to be bent downward. At least a portion of the terminal part (1411b) may be exposed to the outside. The terminal part (1411b) may be coupled with the PCB (10) disposed underneath the first base (1420) by way of soldering. A lower end of the terminal part (1411b) may be directly contacted to the PCB (10). The terminal part (1411b) may be disposed on a terminal coupling part (1424) of the first base (1420).

The first circuit member (1410) may include a coil member (1412). The coil member (1412) may be disposed on the first board (1411). Alternatively, the coil member (1412) may be disposed on the first base (1420). The coil member (1412) may be disposed on an upper surface of first board (1411). The coil member (1412) may be disposed underneath the first magnet (1320). The coil member (1412) may be interposed between the first magnet (1320) and the first base (1420). The coil member (1412) may be coupled by the first support member (1600). The coil member (1412) may movably support the first OIS mover (1300).

The coil member (1412) may include a board part (1412a). The board part (1412a) may be a circuit board. The board part (1412a) may include an FPCB. The board part (1412a) may be integrally formed with the second coil (1412b). The board part (1412a) may be coupled by the first support member (1600). The board part (1412a) may be formed with a hole passed through by the first support member (1600). A lower surface of board part (1412a) and a lower end of the first support member (1600) may be coupled by way of soldering. A center of the board part (1412a) may be formed with a hole corresponding to the hole (1411a) of the first board (1411).

The coil member (1412) may include a second coil (1412b). The second coil (1412b) may face the first magnet (1320). In this case, when a current is supplied to the second coil (1412b) to form a magnetic field about the second coil (1412b), the first magnet (1320) may be moved relative to the second coil (1412b) in response to the electromagnetic interaction between the second coil (1412b) and the first magnet (1320). The second coil (1412b) may electromagnetically interact with the first magnet (1320). The second coil (1412b) may move the first housing (1310) and the first bobbin (1210) relative to the first base (1420) to a direction perpendicular to an optical axis through electromagnetic interaction with the first magnet (1320). The second coil (1412b) may be an FP (Fine Pattern) coil integrally formed on the board part (1412a). The second coil (1412b) may include a plurality of coil units, each mutually spaced apart. The second coil (1412b) may include four coil units, each mutually spaced apart. At this time, the said four coil units may be disposed on the board part (1412a) to allow two adjacent coil units to mutually form an 90°. Meantime, the four coil units may be separately and individually controlled. The second coil (1412b) may sequentially receive a power through the PCB (10), the first board (1411) and the board part (1412a).

The first stator (1400) may include a first base (1420). The first base (1420) may be disposed at a lower surface of first circuit member (1410). An upper surface of first base (1420) may be disposed with a first circuit member (1410). The first base (1420) may be coupled with the first cover (1100). The first base (1420) may be disposed on an upper surface of PCB (10). However, a separate holder member may be interposed between the first base (1420) and the PCB (10). The first base (1420) may function as a sensor holder protecting the first image sensor mounted on the PCB (10).

The first base (1420) may include a hole (1421). The hole (1421) may be formed on the first base (1420). The hole (1421) may be so formed as to vertically penetrate the first base (1420). The hole (1421) may be formed with an infrared filter. However, the infrared filter may be disposed on a separate holder member disposed at a lower surface of the first base (1420). A light having passed the first lens module through the hole (1421) may be irradiated on an image sensor. The hole (1421) may be formed with a round shape.

The first base (1420) may include a foreign object collection part (1422). The foreign object collection part (1422) may collect (capture) foreign objects introduced into the first lens driving device (1000). The foreign object collection part (1422) may include a groove formed by allowing an upper surface of the first base (1420) to be recessed and a dust trap disposed on the groove. The dust trap may possess the viscosity. The foreign objects introduced into the first lens driving device (1000) may be adhered to the dust trap.

The first base (1420) may include a sensor coupling part (1423). The sensor coupling part (1423) may be disposed with a second sensor (1800). The sensor coupling part (1423) may accommodate at least a portion of the second sensor (1800). The sensor coupling part (1423) may include a groove formed by allowing an upper surface of first base (1420) to be recessed. The sensor coupling part (1423) may be spaced apart from the foreign object collection part (1422). The sensor coupling part (1423) may include a plurality of grooves. For example, the sensor coupling part (1423) may be formed with two grooves. At this time, each of the two grooves may be disposed with a second sensor (1800).

The first base (1420) may include a terminal coupling part (1424). The terminal coupling part (1424) may be disposed with a terminal part (1411b) of the first board (1411). The terminal coupling part (1424) may include a groove formed by allowing a portion of one lateral surface of one side of first base (1420) to be recessed inwardly. At this time, the terminal coupling part (1424) may be accommodated by at least a portion of the terminal part (1411b) of the first board (1411). A width of terminal coupling part (1424) may be formed with a width corresponding to that of the terminal part (1411b) of the first board (1411). A length of the terminal coupling part (1424) may be formed to correspond to a length of the terminal part (1411b) of the first board (1411).

The first base (1420) may include a staircase part (1425). The staircase part (1425) may be formed at a lateral surface of first base (1420). The staircase part (1425) may be formed to circumvent an outer circumferential surface of the first base (1420). The staircase part (1425) may be formed by allowing an upper surface of a lateral surface of first base (1420) to be recessed. Alternatively, the staircase part (1425) may be formed by allowing a lower surface of a lateral surface of the first base (1420) to be protruded. The staircase part (1425) may be disposed with a lower end of the side plate (1120) of the first cover (1100).

The first lens driving device (1000) may include a first elastic member (1500). The first elastic member (1500) may be coupled to the first bobbin (1210) and the first housing (1310). The first elastic member (1500) may elastically support the first bobbin (1210). At least a portion of the first elastic member (1500) may possess the elasticity. The first elastic member (1500) may movably support the first bobbin (1210). The first elastic member (1500) may movably support the first bobbin (1210) to allow the first bobbin (1210) to move to the first housing (1310) to an optical axis direction. That is, the first elastic member (1500) may support the first bobbin (1210) for AF driving. At this time, the first elastic member (1500) may be called an 'AF elastic member'.

The first elastic member (1500) may include a first upper elastic member (1510). The first upper elastic member (1510) may be disposed on an upper side of first bobbin (1210) and may be coupled with the first bobbin (1210) and the first housing (1310). The first upper elastic member (1510) may be disposed at an upper side or an upper surface of first bobbin (1210), and at an upper side or an upper surface of the first housing (1310).

The first upper elastic member (1510) may elastically support the first bobbin (1210). The first upper elastic member (1510) may possess the elasticity on at least a portion thereof. The first upper elastic member (1510) may movably support the first bobbin (1210). The first upper elastic member (1510) may movably move the first bobbin (1210) relative to the first housing (1310) to an optical axis direction. The first upper elastic member (1510) may be formed with a leaf spring.

The first upper elastic member (1510) may be formed with a plurality of dividable elements. The first upper elastic member (1510) may include six (6) upper elastic units (1501, 1502, 1503, 1504, 1505, 1506), each mutually spaced apart. The first to sixth upper elastic units (1501, 1502, 1503, 1504, 1505, 1506) may be mutually spaced apart, through which the first to sixth upper elastic units (1501, 1502, 1503, 1504, 1505, 1506) may be used as conductive lines inside the first lens driving device (1000). The first to sixth upper elastic units (1501, 1502, 1503, 1504, 1505, 1506) may be electrically connected to the first circuit member (1410) through the first support member (1600). The first to sixth upper elastic units (1501, 1502, 1503, 1504, 1505, 1506) may be coupled to a board (1720) of the first sensor unit (1700), through which the first to sixth upper elastic units (1501, 1502, 1503, 1504, 1505, 1506) may be electrically connected to the first sensor (1710). At this time, the first to sixth upper elastic units (1501, 1502, 1503, 1504, 1505, 1506) may be electrically connected to the first coil (1220). That is, the first to sixth upper elastic units (1501, 1502, 1503, 1504, 1505, 1506) may be used to supply a power to the first sensor (1710) disposed on the first housing (1310) and the first coil (1220) disposed on the first bobbin (1210).

The first upper elastic member (1510) may include an external part (1511). The external part (1511) may be coupled to the first housing (1310). The external part (1511) may be coupled to an upper side or an upper surface of the first housing (1310). The external part (1511) may be coupled to an upper coupling part (1313) of the first housing (1310). The external part (1511) may include a groove or a hole coupled to the upper coupling part (1313) of the first housing (1310).

The first upper elastic member (1510) may include an internal part (1512). The internal part (1512) may be coupled to the first bobbin (1210). The internal part (1512) may be coupled to an upper side or an upper surface of first bobbin (1210). The internal part (1512) may be coupled to an upper coupling part (1213) of first bobbin (1210). The internal part (1512) may include a groove or a hole coupled with the upper coupling part (1213) of first bobbin (1210).

The first upper elastic member (1510) may include a connection part (1513). The connection part (1513) may connect the external part (1511) and the internal part (1512). The connection part (1513) may elastically connect the external part (1511) and the internal part (1512). The connection part (1513) may possess the elasticity. At this time, the connection part (1513) may be called an 'elastic part'. The connection part (1513) may be formed by being bent more than twice.

The first upper elastic member (1510) may include a coupling part (1514). The coupling part (1514) may be coupled with the first support member (1600). The coupling part (1514) may be coupled to the first support member (1600) by way of soldering. For example, the coupling part (1514) may include a hole passed by the first support member (1600). In another example, the coupling part (1514) may include a groove coupled by the first support member (1600). The coupling part (1514) may be extended from the external part (1511). The coupling part (1514) may include a bent part formed by being bent.

The first upper elastic member (1510) may include a terminal part (1515). The terminal part (1515) may be extended from the external part (1511). The terminal part (1515) may be electrically connected to a board (1720) of the first sensor unit (1700). The terminal part (1515) may be coupled to a terminal of the board (1720) of the first sensor unit (1700) by way of soldering. The terminal part (1515) may include a total of four (4) pieces.

The first elastic member (1500) may include a first lower elastic member (1520). The first lower elastic member (1520) may be disposed at a lower side of the first bobbin (1210), and may be coupled to the first bobbin (1210) and the first housing (1310). The first lower elastic member (1520) may be coupled to the first bobbin (1210) and the first housing (1310). The first lower elastic member (1520) may be coupled to a lower side or a lower surface of first bobbin (1210) and may be coupled to a lower side or a lower surface of first housing (1310). The first lower elastic member (1520) may elastically support the first bobbin (1210). At least a portion of the first lower elastic member (1520) may possess the elasticity. The first lower elastic member (1520) may movably support the first bobbin (1210). The first lower elastic member (1520) may movably support the first bobbin (1210) relative to the first housing (1310) to an optical axis direction. The first lower elastic member (1520) may be formed by a leaf spring. For example, the first lower elastic member (1520) may be integrally formed.

The first lower elastic member (1520) may include an external part (1521). The external part (1521) may be coupled to the first housing (1310). The external part (1521) may be coupled to an upper side or an upper surface of the first housing (1310). The external part (1521) may be coupled to a lower coupling part of the first housing (1310). The external part (1521) may include a groove or a hole coupled to the lower coupling part of the first housing (1310).

The first lower elastic member (1520) may include an internal part (1522). The internal part (1522) may be coupled to the first bobbin (1210). The internal part (1522) may be coupled to an upper side or an upper surface of first bobbin (1210). The internal part (1522) may be coupled to a lower coupling part of first bobbin (1210). The internal part (1522) may include a groove or a hole coupled with the lower coupling part of first bobbin (1210).

The first lower elastic member (1520) may include a connection part (1523). The connection part (1523) may connect the external part (1521) and the internal part (1522). The connection part (1523) may elastically connect the external part (1521) and the internal part (1522). The connection part (1523) may possess the elasticity. At this time, the connection part (1523) may be called an 'elastic part'. The connection part (1523) may be formed by being bent more than twice.

The first lens driving device (1000) may include a first support member (1600). The first support member (1600) may movably support the first housing (1310). The first support member (1600) may elastically support the first housing (1310). At least a portion of the first support member (1600) may possess the elasticity. At this time, the first support member (1600) may be called an 'elastic member'. For example, the first support member (1600) may movably support the first housing (1310) relative to the first stator (1400) to a direction perpendicular to an optical axis. At this time, the first bobbin (1210) may be integrally moved along with the first housing (1310). In another example, the first support member (1600) may tiltably support the first housing (1310) relative to the first stator (1400). That is, the first support member (1600) may support the first housing (1310) and the first bobbin (1210) so that the first housing (1310) and the first bobbin (1210) can be driven for OIS operation. At this time, the first support member (1600) may be called an 'OIS support member'. For example, the first support member (1600) may be formed with a wire. In another example, the first support member (1600) may be formed with a leaf spring.

The first support member (1600) may be coupled to the first upper elastic member (1510) and the first stator (1400). A lower end of the first support member (1600) may be coupled to the first circuit board (1410). A lower end of the first support member (1600) may be coupled to the first board (1411). A lower end of the first support member (1600) may be coupled to a coil member (1412). The first support member (1600) may pass through the first board (1411). Through the said structure, a lower end of the first support member (1600) may be coupled to a lower surface of the first board (1411) by way of soldering. An upper end of the first support member (1600) may be coupled to a coupling part (1514) of the first upper elastic member (1510). The upper end of the first support member (1600) may pass through the coupling part (1514) of the first upper elastic member (1510). In the said structure, the upper end of the first support member (1600) may be coupled to an upper surface of the coupling part (1514) of the first upper elastic member (1510) by way of soldering.

The first support member (1600) may include six (6) support parts (1601, 1602, 1603, 1604, 1605, 1606), each mutually spaced apart. The first support member (1600) may be formed with first to sixth support parts (1601, 1602, 1603, 1604, 1605, 1606) to pair with the first to sixth upper elastic units (1501, 1502, 1503, 1504, 1505, 1506) of the first upper elastic member (1510). In a modification, the first support member (1600) may be formed with eight (8) support parts in consideration of symmetry.

The first to sixth support parts (1601, 1602, 1603, 1604, 1605, 1606) may be mutually spaced apart, through which the first to sixth support parts (1601, 1602, 1603, 1604, 1605, 1606) may be used as conductive lines inside the first lens driving device (1000). The first to sixth support parts (1601, 1602, 1603, 1604, 1605, 1606) may be coupled with the first circuit member (1410). The first to sixth support parts (1601, 1602, 1603, 1604, 1605, 1606) may be coupled with the first upper elastic member (1510). That is, the first to sixth support parts (1601, 1602, 1603, 1604, 1605, 1606) may electrically connect the first circuit member (1410) with the first upper elastic member (1510). The first support part (1601) may be coupled to the first upper elastic unit (1501), the second support part (1602) may be coupled to the second upper elastic unit (1502), the third support part (1603) may be coupled to the third upper elastic unit (1503), the fourth support part (1604) may be coupled to the fourth upper elastic unit (1504), the fifth support part (1605) may be coupled to the fifth upper elastic unit (1505), and the sixth support part (1606) may be coupled to the sixth upper elastic unit (1506). The first to sixth support parts (1601, 1602, 1603, 1604, 1605, 1606) may be wires respectively.

The first lens driving device (1000) may include a damper (not shown). The damper may be disposed on the first support member (1600). The damper may be disposed on the first support member (1600) and the first housing (1310). The damper may be disposed on the first elastic member (1500). The damper may be disposed on the first elastic member (1500) and/or on the first support member (1600) to inhibit the resonant phenomenon generated from the first elastic member (1500) and/or the first support member (1600).

The first lens driving device (1000) may include a first sensor unit (1700). The first sensor unit (1700) may be provided for AF feedback. The first sensor unit (1700) may detect the movement of the first bobbin (1210) to an optical axis direction. The first sensor unit (1700) may detect an amount of movement of the first bobbin (1210) to an optical axis direction and provide the amount of movement to a controller in real time.

The first sensor unit (1700) may include a first sensor (1710). The first sensor (1710) may be disposed on the first housing (1310). The first sensor (1710) may be disposed on a corner part of the first housing (1310). The first sensor (1710) may be interposed between first and third lateral parts (1301, 1303). The first sensor (1710) may be disposed on the board (1720). The first sensor (1710) may be electrically connected to the board (1720). The first sensor (1710) may be coupled to the board (1720) by way of SMT (Surface Mounting Technology) method. The first sensor (1710) may detect a first sensing magnet (1730). The first sensor (1710) may include a Hall IC (Hall IC) detecting the magnetic field of magnet. The first sensor (1710) may include a Hall-integrated driver. The first sensor (1710) may include a temperature detecting function. The first sensor (1710) may be fixed to the first housing (1310), and the first sensing magnet (1730) may be fixed to the first bobbin (1210). When the first sensing magnet (1730) moves along with the first bobbin (1210), the magnetic flux density detected by the Hall sensor inside the first sensor may be changed in response to a relative position of the first sensor (1710) and the first sensing magnet (1730). The first sensor (1710) may detect the position of the first lens module using an output voltage of the Hall device proportion to the magnetic flux density that changes in response to the relative position of the first sensor (1710) and the first sensing magnet (1730).

The first sensor unit (1700) may include a board (1720). The board (1720) may be disposed on the first housing (1310). The board (1720) may be coupled with the first sensor (1710). The board (1720) may be coupled with the first upper elastic member (1510). The board (1720) may include four terminals coupled with the first to fourth upper elastic units (1501, 1502, 1503, 1504) of the first upper elastic member (1510). The board (1720) and the first upper elastic member may be coupled by way of soldering. An upper surface of board (1720) may be coupled with the first to fourth upper elastic units (1501, 1502, 1503, 1504) of the first upper elastic member (1510) and a lower surface of the board (1720) may be coupled with the first sensor (1710).

The first sensor unit (1700) may include a first sensing magnet (1730). The first sensing magnet (1730) may be disposed on a lateral surface of the first bobbin (1210) facing the corner part between the first and third lateral parts (1301, 1303) of the first housing (1310). The first sending magnet (1730) may be disposed on the first bobbin (1210). The first sending magnet (1730) may be detected by the first sensor (1710). The first sensing magnet (1730) may face the first sensor (1710). The first sensing magnet (1730) may be disposed on the first coil (1220). The first sensing magnet (1730) may be brought into contact with the first coil (1220). In a modification, a portion of the first bobbin (1210) may be interposed between the first sensing magnet (1730) and the first coil (1220). An upper surface of first sensing magnet (1730) may be disposed at a higher level than an upper surface of the first sensor (1710). A lower surface of the first sensing magnet (1730) may be disposed at a lower level than a lower surface of the first sensor (1710).

The first sensor unit (1700) may include a first compensation magnet (hereinafter referred to as 'fourth magnet', 1740). However, the first compensation magnet (1740) may be understood as a separate element from the first sensor unit (1700). The first compensation magnet (1740) may be disposed to maintain a magnetic balance with the first sensing magnet (1730). The first compensation magnet (1740) may be disposed on the first bobbin (1210). The first compensation magnet (1740) may be symmetrical with the first sensing magnet (1730) about a center axis of the first bobbin (1210). The first compensation magnet (1740) may have a magnetism corresponding to that of the first sensing magnet (1730).

The first lens driving device (1000) may include a second sensor (1800). The second sensor (1800) may be provided for OIS feedback. The second sensor (1800) may detect the movement of first housing (1310). The second sensor (1800) may detect the movement or tilt of the first housing (1310) and/or the first bobbin (1210) to a direction perpendicular to an optical axis. The second sensor (1800) may detect the first magnet (1320). The second sensor (1800) may be disposed on the first stator (1400). The second sensor (1800) 는 may be disposed at a lower surface of first board (1411). The second sensor (1800) may be electrically connected to the first board (1411). The second sensor (1800) may be disposed on the first base (1420). The second sensor (1800) may be a Hall sensor. The second sensor (1800) may be a Hall IC (Hall integrated circuit). The second sensor (1800) may detect the magnetic force of the first magnet (1320). That is, the second sensor (1800) may detect a displacement amount of the first housing (1310) by detecting the changes in the magnetic force that is changed by the movement of the first magnet when the first housing (1310) is moved. The second sensor (1800) may be provided in a plural number. The second sensor (1800) may include a first axis sensor (1810) and a second axis sensor (1820). At this time, the first axis sensor (1810) may detect the x axis movement (optical axis is z axis) of the first housing (1310) and the second axis sensor (1820) may detect the y axis movement of the first housing (1310).

Hereinafter, elements of the second lens driving device according to the exemplary embodiment will be described with reference to the accompanying drawings.

Figure 10:
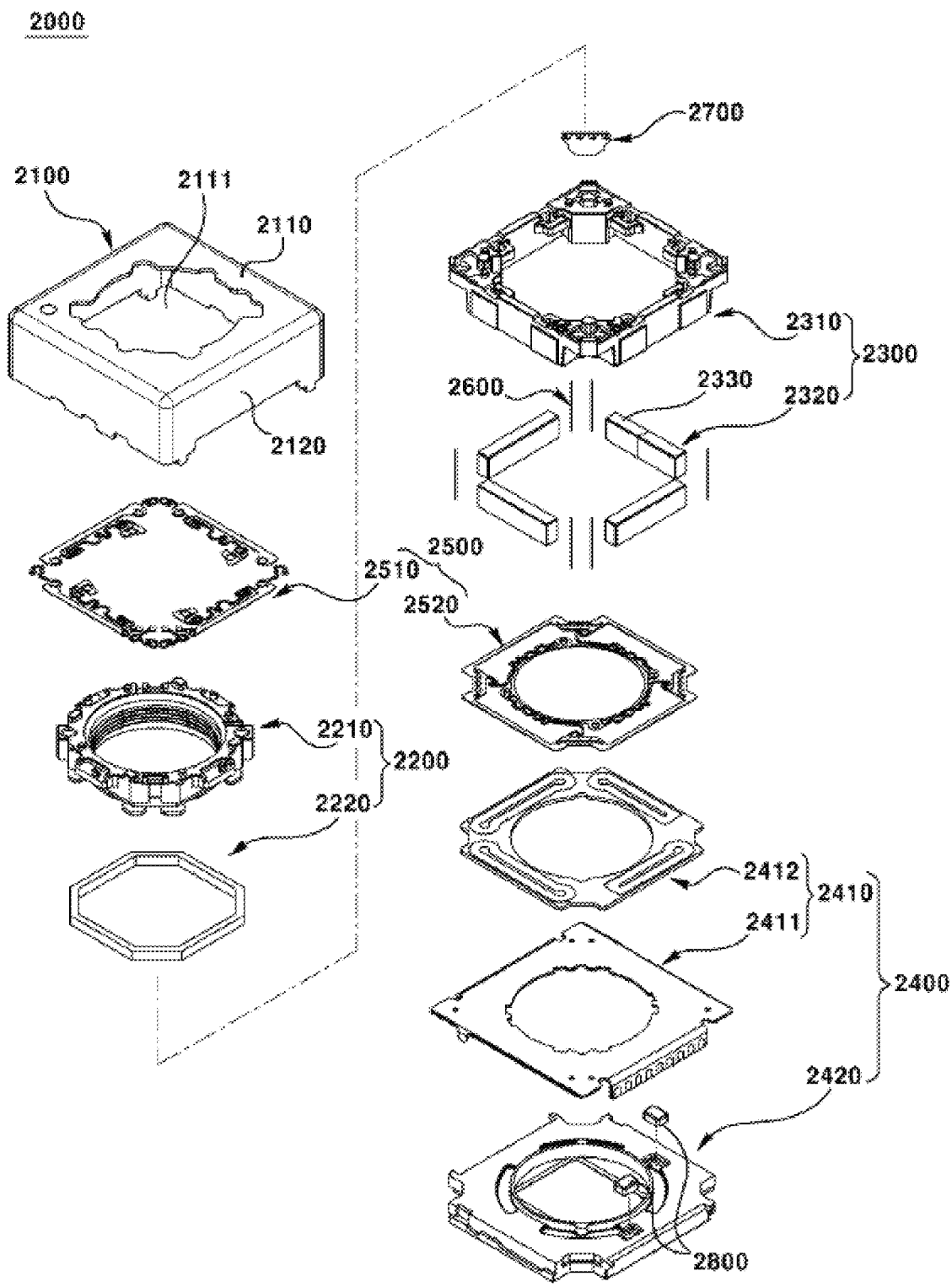
FIG. 10 is an exploded perspective view of a second lens driving device according to an exemplary embodiment of the present invention.
Figure 11:
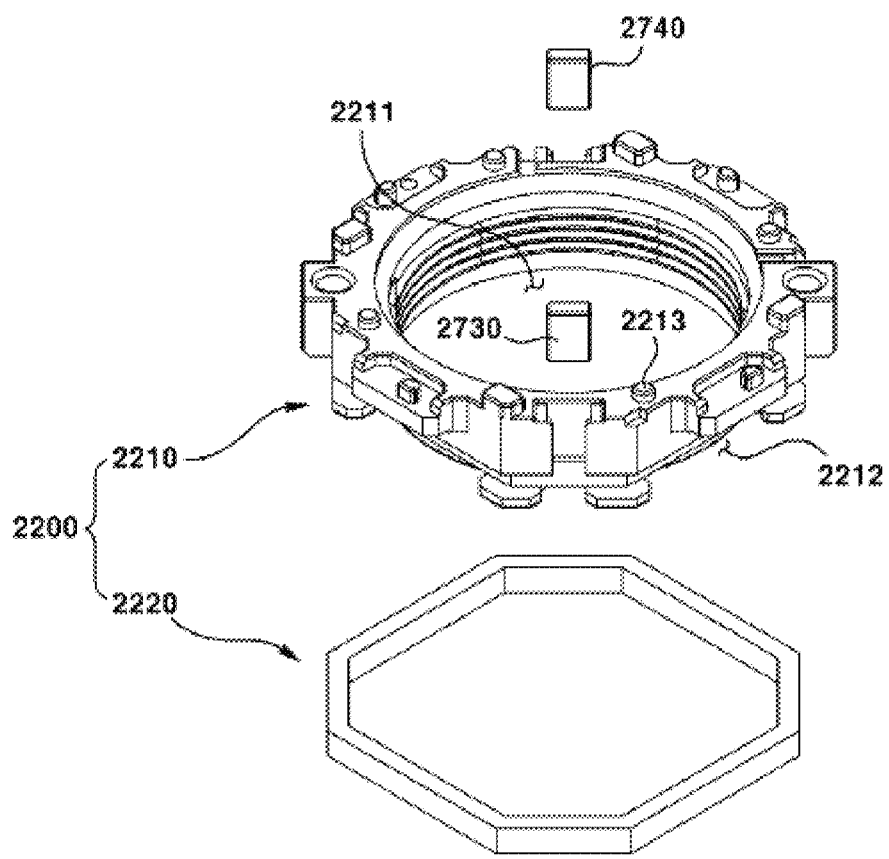
FIG. 11 is an exploded perspective view of a second AF mover and relevant elements according to an exemplary embodiment of the present invention.
Figure 12:
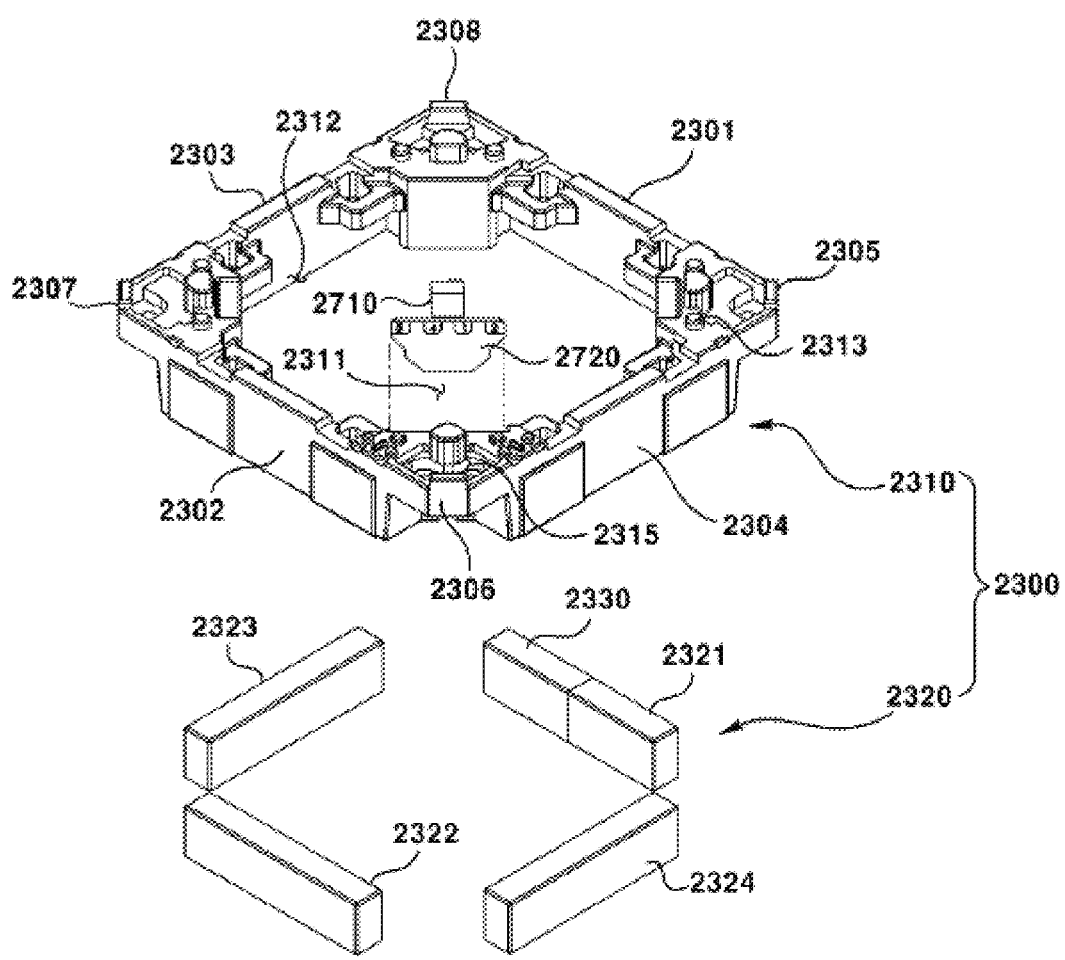
FIG. 12 is an exploded perspective view of a second OIS mover and relevant elements according to an exemplary embodiment of the present invention.
Figure 13:
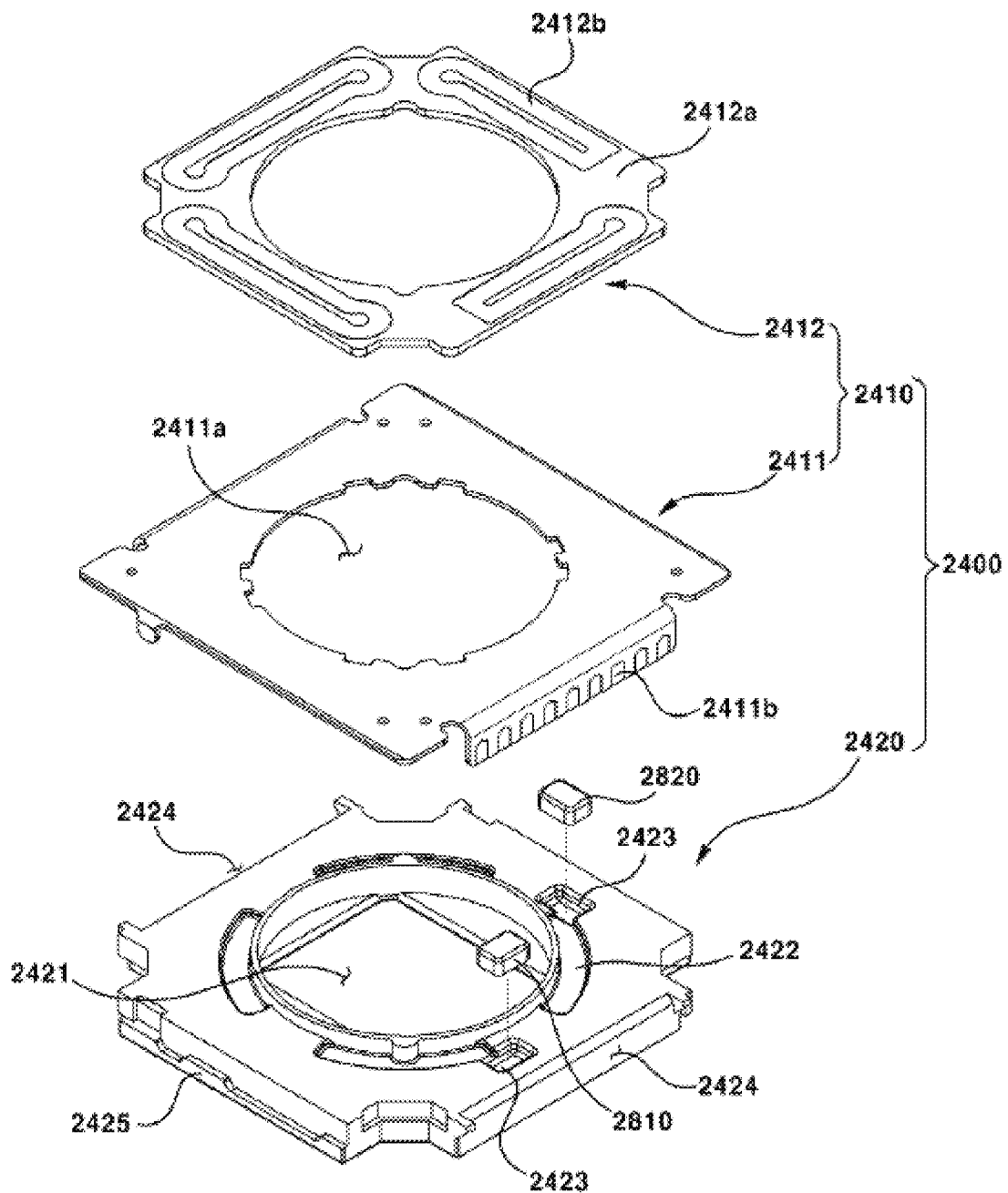
FIG. 13 is an exploded perspective view of a second stator and relevant elements according to an exemplary embodiment of the present invention.
Figure 14:
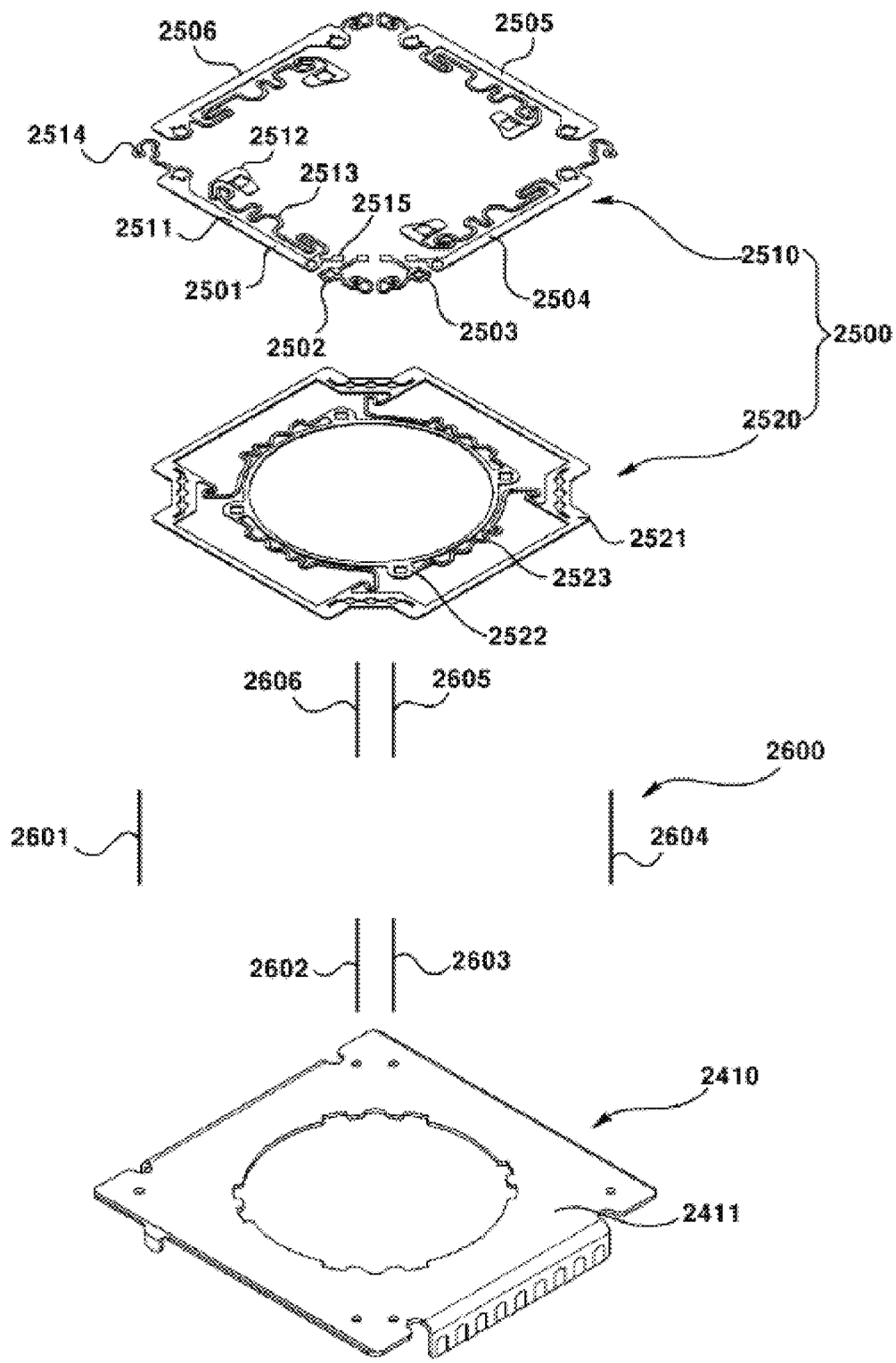
FIG. 14 is an exploded perspective view of a second elastic member, a second support member and relevant elements according to an exemplary embodiment of the present invention.
Figure 15:
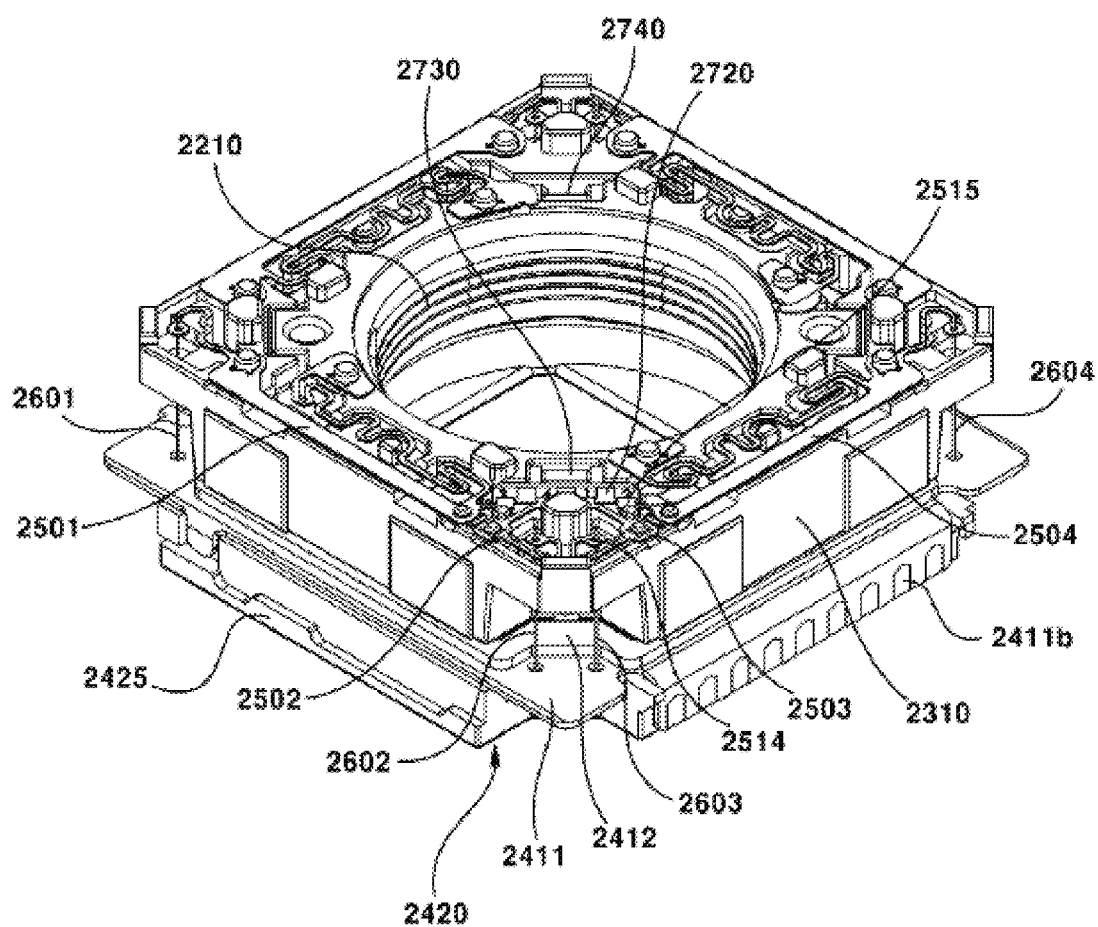
FIG. 15 is a perspective view of a second lens driving device omitted of some elements according to an exemplary embodiment of the present invention.
Figure 16:
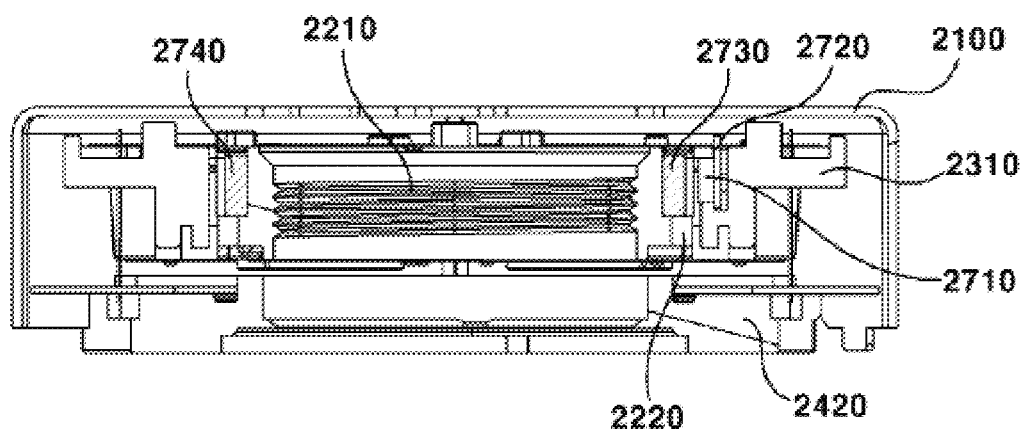
FIG. 16 is a cross-sectional view of a second lens driving device according to an exemplary embodiment of the present invention.

FIG. 10 is an exploded perspective view of a second lens driving device according to an exemplary embodiment of the present invention, FIG. 11 is an exploded perspective view of a second AF mover and relevant elements according to an exemplary embodiment of the present invention, FIG. 12 is an exploded perspective view of a second OIS mover and relevant elements according to an exemplary embodiment of the present invention, FIG. 13 is an exploded perspective view of a second stator and relevant elements according to an exemplary embodiment of the present invention, FIG. 14 is an exploded perspective view of a second elastic member, a second support member and relevant elements according to an exemplary embodiment of the present invention, FIG. 15 is a perspective view of a second lens driving device omitted of some elements according to an exemplary embodiment of the present invention and FIG. 16 is a cross-sectional view of a second lens driving device according to an exemplary embodiment of the present invention.

The first lens driving device (2000) may include a second housing (2310), a second bobbin (2210) disposed inside of the second housing (2310), a third coil (2220) disposed inside of the second bobbin (2210), a second magnet (2320) disposed on the second housing (2310) to face the third coil (2220), a fourth coil (2412*b*) facing the second magnet (2320), and a second circuit member (2410) so disposed as to be spaced apart from the second housing (2310) {e.g., underneath the second housing (2310)}. The second lens driving device (2000) may further include a second sensing magnet (2730) disposed on the second bobbin (2210), and a third sensor (2710) disposed on the second housing (2310) to face the second sensing magnet (2730).

The second lens driving device (2000) may comprise a second cover (2100). The second cover (2100) may be accommodated at an inside of a second housing (2310). The second cover (2100) may form an external shape of the second lens driving device (2000). The second cover (2100) may take a bottom-opened cubic shape. The second cover (2100) may be made of a non-magnetic substance. The second cover (2100) may be formed with a metal material. To be more specific, the second cover (2100) may be formed with a metal plate. In this case, the second cover (2100) may shield an EMI (Electro Magnetic Interference). Because of the said characteristic of the second cover (2100), the second cover (2100) may be called an "EMI shield can". The second cover (2100) can shield radio waves generated from outside of the second lens driving device (2000) from being introduced into the second cover (2100). Furthermore, the second cover (2100) can shield radio waves generated from inside of the second cover (2100) from being discharged to outside of the second cover (2100).

The second cover (2100) may include an upper plate (2110) and a side plate (2120). The second cover (2100) may include an upper plate (2110) and a side plate (2120) downwardly extended from an edge of the upper plate (2110). A lower end of the side plate (2120) at the second cover (2100) may be coupled to a second base (2420). The lower end of the side plate (2120) of the second cover (2100) may be coupled to a step (staircase, 2425) of the second base (2420). An inner lateral surface of the side plate (2120) of the second cover (2100) may be coupled to an outside lateral surface of the second base (2420) by an adhesive. An inner space formed by the second cover (2100) and the second base (2420) may be disposed with a second AF mover (2200) and a second OIS mover (2300). Through this structure, the second cover (2100) can protect inner elements from an outside shock and simultaneously inhibit an outside foreign contaminated object from being inwardly introduced. In a modification, the lower end of the side plate (2120) of the second cover (2100) may be directly coupled with a PCB (10). One of the plurality of side plates (2120) may face a second cover (2100).

The upper plate (2110) of second cover (2100) may include a hole (2111). The hole (2111) may be formed on the upper plate (2110). The hole (2111) may expose a second lens module. The hole (2111) may be formed with a shape corresponding to that of the second lens module. The size of the hole (2111) may be formed to be greater than a diameter of the second lens module to allow the second lens module to be assembled through the hole (2111). Meantime, a light having been introduced through the hole (2111) may pass through the second lens module. At this time, the light having passed the second lens module may be converted to an electric signal by a second image sensor and may be obtained as an image.

The second lens driving device (2000) may include a second AF mover (2200). The second AF mover (2200) may be coupled with a second lens module. The second AF mover (2200) may be accommodated into an inside of the second lens module. An inner periphery surface of the second AF mover (2200) may be coupled by an outer periphery surface of the second lens module. The second AF mover (2200) may be moved through interaction with a second OIS mover (2300) and/or a second the stator (2400). At this time, the second AF mover (2200) may move integrally with the second lens module. The second AF mover (2200) may move for AF focus function. Furthermore, the second AF mover (2200) may move for the OIS function.

The second AF mover (2200) may include a second bobbin (2210). The second bobbin (2210) may be disposed at an inside of a second housing (2310). The second bobbin (2210) may be disposed on a hole (2311) of the second housing (2310). The second bobbin (2210) may move to an optical axis direction relative to the second housing (2310). The second bobbin (2210) may be coupled with the second lens module. An inner periphery surface of the second bobbin (2210) may be coupled by an outer periphery surface of the second lens module. The second bobbin (2210) may be coupled by a third coil (2220). An outer periphery surface of the second bobbin (2210) may be coupled by the third coil (2220). An upper surface of the second bobbin (2210) may be coupled by a second upper elastic member (2510). A lower surface of the second bobbin (2210) may be coupled by a second lower elastic member (2520).

The second bobbin (2210) may include a hole (2211), The hole (2211) may be disposed at an inside of the second bobbin (2210). The hole (2211) may be so formed as to be opened at an upper side and a bottom side. The hole (2211) may be coupled by a second lens module. An inner periphery surface of the hole (2211) may be formed with a screw thread corresponding to that formed on an outer periphery surface of the second lens module. The second lens module may be screw-connected with the second bobbin (2210). The second lens module may be coupled the second bobbin (2210) using an adhesive. At this time, the adhesive may be an epoxy hardened by any one or more of UV, heat and laser.

The second bobbin (2210) may include a driving part coupling part (2212). The driving part coupling part (2212) may be coupled by a third coil (2220). The driving part coupling part (2212) may be formed on an outer periphery surface of the second bobbin (2210). The driving part coupling part (2212) may be formed by a groove formed by allowing a portion of the outer periphery surface of the second bobbin (2210) to be inwardly recessed. The second bobbin (2210) may include an upper coupling part (2213). The upper coupling part (2213) may be coupled with the second upper elastic member (2510). The upper coupling part (2213) may be coupled to an inner part (2512) of the second upper elastic member (2510). The upper coupling part (2213) may include a lug protruding from an upper surface of the second bobbin (2210). The lug of the upper coupling part (2213) may be coupled to a groove or a hole of the inner part (2512) of the second upper elastic member (2510). At this time, the lug of the upper coupling part (2213) may be fused while being inserted into the hole of the inner part (2512) to allow the second upper clastic member (2510) to be fixed between the fused lug and an upper surface of the second bobbin (2210). In a modification, the upper coupling part (2212) may include a groove. In this case, an adhesive may be disposed on the groove of the upper coupling part (2212) to allow the second upper elastic member (2510) to be fixed.

The second bobbin (2210) may include a lower coupling part. The lower coupling part may be coupled with the second lower elastic member (2520). The lower coupling part may be coupled with an inner part (2522) of the second lower elastic member (2520). The lower coupling part may include a lug protruding from a lower surface of the second bobbin (2210). For example, the lug of the lower coupling part may be coupled into a groove or a hole of the inner part (2522) of the second lower elastic member (2520). At this time, the lug of the lower coupling part may be fused while being inserted into the hole of the inner part (2512) to allow the second lower elastic member (2520) to be fixed between the fused lug and a lower surface of the second bobbin (2210). In a modification, the lower coupling part may include a groove. In this case, an adhesive may be disposed on the groove of the lower coupling part to allow the second lower elastic member (2520) to be fixed.

A second AF mover (2200) may include a third coil (2220). The third coil (2220) may be disposed on the second bobbin (2210). The third coil (2220) may be disposed on an outer periphery surface of the second bobbin (2210). The third coil (2220) may be directly wound on the second bobbin (2210). Alternatively, the third coil (2220) may be disposed on the second bobbin (2210) while being directly wound on the second bobbin (2210). The third coil (2220) may face the second magnet (2320). In this case, when a current is supplied to the third coil (2220) to form a magnetic field about the third coil (2220), the third coil (2220) may be moved relative to the second magnet (2320) in response to an electromagnetic interaction between the third coil (2220) and the second magnet (2320). The third coil (2220) may electromagnetically interact with the second magnet (2320). The third coil (2220) may move the second bobbin (2210) relative to the second housing (2310) to an optical axis direction through the electromagnetic interaction with the second magnet (2320). At this time, the third coil (2220) may be called an 'AF coil'. The third coil (2220) may be integrally formed.

The third coil (2220) may include a pair of lead cables for power supply. At this time, the pair of lead cables of the third coil (2220) may be electrically connected to fifth and sixth upper elastic units (2505, 2506), which are elements of the second upper elastic member (2510). That is, the third coil (2220) may receive a power through the second upper elastic member (2510). To be more specific, the third coil (2220) may receive a power sequentially through a PCB (10), a second upper clastic member (2410), a second support member (2600) and a second upper elastic member (2510). Alternatively, the third coil (2220) may receive a power from a second lower clastic member (2520).

The second lens driving device (2000) may include a second OIS mover (2300). The second OIS mover (2300) may accommodate, at an inside, at least a portion of a second AF mover (2200). The second OIS mover (2300) may move the second AF mover (2200) or may move with the second AF mover (2200). The second OIS mover (2300) may be moved through the interaction with the second stator (2400). The second OIS mover (2300) may be moved for OIS function. At this time, the second OIS mover (2300) may be integrally moved with the second AF mover (2200) for the OIS function.

The second OIS mover (2300) may include a second housing (2310). The second housing (2310) may be disposed at an outside of the second bobbin (2210). The second housing (2310) may accommodate, at an inside thereof, at least a portion of the second bobbin (2210). The second housing (2310) may be disposed with a second magnet (2320). An outer periphery surface of the second housing (2310) may take a shape corresponding to that of an inner periphery surface of a side plate (2120) of the second cover (2100). The second housing (2310) may be formed with an insulation material. The second housing (2310) may be formed with a material different from that of the second cover (2100). An outer lateral surface of the second housing (2310) may be spaced apart from an inner surface of the side plate (2120) of the second cover (2100). The second housing (2310) may move in a discrete space between the second housing (2310) and the second cover (2100) for OIS driving. An upper surface of the second housing (2310) may be coupled by the second upper elastic member (2510). A lower surface of second housing (2310) may be coupled by a second lower elastic member (2520).

The second housing (2310) may include four lateral parts and four corner parts disposed among the four lateral parts. The second housing (2310) may include fifth to eighth lateral parts (2301, 2302, 2303, 2304). The second housing (2310) may include fifth to eighth corner parts (2305, 2306, 2307, 2308). The second housing (2310) may include fifth to eighth corner parts (2305, 2306, 2307, 2308) disposed among the fifth to eighth lateral parts (2301, 2302, 2303, 2304). The second housing (2310) may include a fifth lateral part (2301) corresponding to a second lateral surface of the second lens driving device (2000), and a sixth lateral part (2302) disposed opposite to the fifth lateral part (2301). The second housing (2310) may include a seventh lateral part (2303) and an eighth lateral part (2304) that are disposed between the fifth lateral part (2301) and the sixth lateral part (2302) and that are mutually oppositely disposed.

The second housing (2310) may include a hole (2311). The hole (2311) may be formed on the second housing (2310). The hole (2311) may be formed at an inside of the second housing (2310). The hole (2311) may be so formed as to vertically pass through the second housing (2310). The hole (2311) may be formed with a second bobbin (2210). The hole (2311) may be movably disposed with the second bobbin (2210). The hole (2311) may be partially formed with a shape corresponding to that of the second bobbin (2210). An inner periphery surface of the second housing (2310) forming the hole (2311) may be spaced apart from an outer periphery surface of the second bobbin (2210). However, an inner surface of the second housing (2310) forming the hole (2311) may be disposed with a stopper inwardly protruded to mechanically restrict the movement of the second bobbin (2210) to an optical axis direction.

The second housing (2310) may include a driving part coupling part (2312). The driving part coupling part (2312) may be coupled by a second magnet (2320). The driving part coupling part (2312) may be formed on an inner periphery surface of the second housing (2310). In this case, it is advantageous for the second magnet (2320) disposed on the driving part coupling part (2312) to electromagnetically interact with the third coil (2220) disposed on an inside of the second magnet (2320). The driving part coupling part (2312) may take a bottom-opened shape. In this case, the second magnet (2320) disposed on the driving part coupling part (2312) may have an advantageous electromagnetic interaction with the fourth coil (2412b) disposed at a lower side of the second magnet (2320). The driving part coupling part (2312) may be formed as a groove formed on an inner periphery surface of the second housing (2310). For example, the driving part coupling part (2312) may be formed on a lateral part of the second housing (2310). In another example, the driving part coupling part (2312) may be formed on a corner part of the second housing (2310).

The second housing (2310) may include an upper coupling part (2313). The upper coupling part (2313) may be coupled with the second upper elastic member (2510). The upper coupling part (2313) may be coupled with an outer part (2511) of the second upper elastic member (2510). The upper coupling part (2313) may include a lug protrusively and upwardly formed from an upper surface of the second housing (2310). For example, the lug on the upper coupling part (2313) may be coupled to a groove or a hole of the outer part (2511) of the second upper elastic member (2510). At this time, the lug of the upper coupling part (2313) may be fused while being inserted into a hole of the outer part (2511) to allow the second upper elastic member (2510) to be fixed between the fused lug and an upper surface of the second housing (2310). In a modification, the upper coupling part (2313) may include a groove. In this case, an adhesive may be disposed on the groove of the upper coupling part (2313) to allow the second upper elastic member (2510) to be fixed.

The second housing (2310) may include a lower coupling part (not shown). The lower coupling part may be coupled to the second lower elastic member (2520). The lower coupling part may be coupled with an outer part (2521) of the second lower elastic member (2520). The lower coupling part may include a lug protrusively and downwardly formed from a lower surface of the second housing (2310). For example, the lug on the lower coupling part may be coupled to a groove or a hole of the outer part (2521) of the second lower elastic member (2520). At this time, the lug of the lower coupling part may be fused while being inserted into a hole of the outer part (2521) to allow the second lower elastic member (2520) to be fixed between the fused lug and a lower surface of the second housing (2310). In a modification, the lower coupling part may include a groove. In this case, an adhesive may be disposed on the groove of the lower coupling part to allow the second lower elastic member (2520) to be fixed.

The second housing (2310) may include a sensor coupling part (2315). The sensor coupling part (2315) may be disposed with at least a portion of the third sensor unit (2700). The sensor coupling part (2315) may be disposed with a third sensor (2710). The sensor coupling part (2315) may be formed on the second housing (2310). The sensor coupling part (2315) may include a groove formed by allowing a portion of the upper surface of the second housing (2310) to be recessed. At this time, the sensor coupling part (2315) may be accommodated by at least a portion of the third sensor (2710). Furthermore, at least a portion of the sensor coupling part (2315) may be formed with a shape corresponding to that of the third sensor (2710).

The second OIS mover (2300) may include a second magnet (2320). The second magnet (2320) may be disposed on the second housing (2310). The second magnet (2320) may be disposed outside of the third coil (2220). The second magnet (2320) may face the third coil (2220). The second magnet (2320) may electromagnetically interact with the third coil (2220). The second magnet (2320) may be disposed above a fourth coil (2412*b*). The second magnet (2320) may face the fourth coil (2412*b*). The second magnet (2320) may electromagnetically interact with the fourth coil (2412*b*). The second magnet (2320) may be commonly used for AF function and the OIS function. The second magnet (2320) may be disposed at a lateral part of the second housing (2310). At this time, the second magnet (2320) may be a flat plated magnet. The second magnet (2320) may take a shape of a flat plate. In a modification, the second magnet (2320) may be disposed on a corner part of second housing (2310). At this time, the second magnet (2320) may be a corner magnet. The second magnet (2320) may take a cubic shape having a greater inner lateral surface than an outer lateral surface.

At least a portion of the second magnet (2320) may be disposed at an area lower than the second sensor (2710). An entire of the second magnet (2320) may be disposed at an area lower than the second sensor (2710). A portion of the second magnet (2320) may be disposed underneath the second sensor (2710) and the remaining portion of the second magnet (2320) may be disposed on a same height as that of the second sensor (2710). That is, a portion of the second magnet (2320) may be overlapped with the second sensor (2710) to a horizontal direction. The second magnet (2320) may be disposed at an area lower than the second sensing magnet (2730). The second magnet (2320) may be disposed at an area lower than a second compensation magnet (2740).

The second magnet (2320) may include mutually spaced-apart fifth to eighth magnet units (2321, 2322, 2323, 2324). The second magnet (2320) may include a fifth magnet unit (2321) disposed at a fifth lateral part (2301) of the second housing (2310). The second magnet (2320) may include a sixth magnet unit (2322) disposed at a sixth lateral part (2302) of the second housing (2310). The second magnet (2320) may include a seventh magnet unit (2323) disposed at a seventh lateral part (2303) of the second housing (2310). The second magnet (2320) may include an eighth magnet unit (2324) disposed at an eighth lateral part (2304) of the second housing (2310).

The second magnet (2320) may include a fifth magnet unit (2321) disposed on the fifth lateral part (2301) of the second housing (2310), and a sixth magnet unit (2322) disposed on the sixth lateral part (2302) of the second housing (2310). Each of the fifth magnet unit (2321) and the sixth magnet unit (2322) may include an inner surface facing the third coil (2220), an outer surface disposed opposite to the inner surface and both lateral surfaces connecting the inner surface and the outer surface. At this time, a distance between both lateral surfaces of the fifth magnet unit (2321) may be shorter than a distance between both lateral surfaces of the sixth magnet unit (2322). That is, a crosswise length of the inner surface of the fifth magnet unit (2321) may be shorter than a crosswise length of the inner surface of the sixth magnet unit (2322). However, a lengthwise length of the inner surface of the fifth magnet unit (2321) may be same as a lengthwise length of the inner surface of the sixth magnet unit (2322).

A distance between both lateral surfaces of fifth magnet unit (2321) may be 50% of a distance between the both lateral surfaces of the sixth magnet unit (2322). Alternatively, a distance between both lateral surfaces of the fifth magnet unit (2321) may be 40% to 60% of a distance between the both lateral surfaces of the sixth magnet unit (2322). Alternatively, a distance between both lateral surfaces of the fifth magnet unit (2321) may be 30% to 70% of a distance between the both lateral surfaces of the sixth magnet unit (2322).

The fifth magnet unit (2321) may be smaller in size than the sixth magnet unit (2322). A volume of the fifth magnet unit (2321) may be smaller than that of the sixth magnet unit (2322). A surface area of the fifth magnet unit (2321) may be smaller than that of the sixth magnet unit (2322). As a result, the magnetic field interference affected by the second magnet (2320) to the first lens driving device (1000) can be minimized by arranging the smaller-sized fifth magnet unit (2321) closer to the first lens driving device (1000).

The fifth magnet unit (2321) disposed on the fifth lateral part (2301) of the second housing (2310) may be more eccentrically disposed toward an eighth lateral part (2304) of the second housing (2310) than a seventh lateral part (2303) of the second housing (2310). At this time, the third sensor (2710) facing the second sensing magnet (2730) may be interposed between the fifth lateral part (2301) of the second housing (2310) and the seventh lateral part (2303) of the second housing (2310). That is, the fifth magnet unit (2321) may be so eccentrically disposed as to be spaced apart from the third sensor (2710).

The fifth magnet unit (2321) may be disposed on the fifth lateral part (2301) of the second housing (2310) by being leaned toward a corner part of one side. The fifth magnet unit (2321) may be eccentrically disposed toward one side. An eccentric direction of the fifth magnet unit (2321) may be opposite from that of a first magnet unit (1321) of the facing first lens driving device (1000). The fifth magnet unit (2321) may be eccentrically disposed toward one side from the fifth lateral part (2301) of the second housing (2310), and the first magnet unit (1321) may be eccentrically disposed toward an opposite direction of the eccentric direction of the fifth magnet unit (2321) from a first lateral part (1301) of first housing (1310), through which an overlapped area between the fifth magnet unit (2321) and the first magnet unit (1321) may be minimized. In the said structure, the magnetic field interference between the fifth magnet unit (2321) and the first magnet unit (1321) may be minimized.

The fifth magnet unit (2321) may include an area that is not overlapped with the first magnet unit (1321) of the first magnet (1320) of the first lens driving device (1000) from an optical axis of the second lens driving device (2000) toward an optical axis of the first lens driving device (1000). Furthermore, the fifth magnet unit (2321) may never be overlapped with the first magnet unit (1321) of the first magnet (1320) of the first lens driving device (1000) from an optical axis of the second lens driving device (2000) toward an optical axis of the first lens driving device (1000). As mentioned above, through the said structure, the magnetic field interference between the fifth magnet unit (2321) and the first magnet unit (1321) can be minimized.

The second magnet (2320) may include a seventh magnet unit (2323) disposed on a seventh lateral part (2303) of the second housing (2310), and an eighth magnet unit (2324) disposed on an eighth lateral part (2304) of the second housing (2310). Each of the seventh magnet unit (2323) and the eighth magnet unit (2324) may include an inner surface facing the third coil (2220), an outer surface disposed opposite to the inner surfaces of the seventh magnet unit (2323) and the eighth magnet unit (2324) and both lateral surfaces connecting the inner surfaces of the seventh magnet unit (2323) and the eighth magnet unit (2324) and the outer surfaces of the seventh magnet unit (2323) and the eighth magnet unit (2324). A distance between both lateral surfaces of the sixth magnet unit (2322) may be same as a distance between both lateral surfaces of the seventh magnet unit (2323) and a distance between the both lateral surfaces of eighth magnet unit (2324).

A distance between both lateral surfaces of sixth magnet unit (2322), a distance between both lateral surfaces of the seventh magnet unit (2323) and a distance between both lateral surfaces of eighth magnet unit (2324) may be all the same. At this time, the thickness and height of the sixth magnet unit (2322), the seventh magnet unit (2323) and the eighth magnet unit (2324) may be all the same. That is, the sixth magnet unit (2322), the seventh magnet unit (2323) and the eighth magnet unit (2324) may have the same shape and size. However, the fifth magnet unit (2321) may be formed to be smaller in size than the sixth magnet unit (2322), the seventh magnet unit (2323) and the eighth magnet unit (2324). In this case, the sensitivity to X axis direction and Y axis direction during OIS driving may be different because of difference in magnetic force among the fifth to eighth magnet units (2321, 2322, 2323, 2324), which can be corrected by controlling a value of a current applied from a driver IC of controller to each of the coil unit of the fourth coil (2412b). Alternatively, this can be corrected by differentiating the number of windings wound on each coil unit of the fourth coil (2412b).

A length of major axis (horizontal length) of inner surface at the fifth magnet unit (2321) may be shorter than a length of major axis of inner surface of the sixth to eighth magnet unit (2322, 2323, 2324). A length of minor axis of inner surface (horizontal length) of fifth magnet unit (2321) may be same as a length of minor axis of inner surface of the sixth to eighth magnet units (2322, 2323, 2324). A thickness of fifth magnet unit (2321) may be same as that of sixth to eighth magnet unit (2322, 2323, 2324).

The second lens driving device (2000) may include a dummy member (2330). The fifth lateral part (2301) of the second housing (2310) may be formed with a dummy member (2330) having a weaker magnetism than the fifth magnet unit (2321) or may be formed with a dummy member (2330) having a non-magnetism. The magnetism of the dummy member (2330) may be weak or may have no magnetism. In the present exemplary embodiment, there may be generated an imbalance of weight because the fifth magnet unit (2321) is smaller in size and weight compared with other magnet units, which may be a factor generating a tilt of the second housing (2310). As a result, the dummy member (2330) that corrects the weight imbalance may be disposed to thereby solve the said weight imbalance.

The dummy member (2330) may be so disposed as to adjust a center of weight of the second magnet (2320). To be more specific, the dummy member (2330) may be disposed in order to solve the imbalance generated when the weight of the fifth magnet unit (2321) is different from the weight of other magnet units. A sum of mass of dummy member (2330) and a mass of the fifth magnet unit (2321) may be the same as the mass of the sixth magnet unit (2322). A center of dummy member (2330), the fifth magnet unit (2321) and the sixth magnet unit (2322) may be disposed on a central axis of the second housing (2310). Furthermore, a center of weight of the dummy member (2330) and the fifth to eighth magnet unit (2321, 2322, 2323, 2324) may be disposed on a central axis of the second housing (2310). Through the said structure, the tilt generated from the second housing (2310) due to weight imbalance of the second magnet (2320) can be inhibited.

The dummy member (2330) may be disposed on the side of the fifth magnet unit (2321). The dummy member (2330) may be disposed adjacent to the fifth magnet unit (2321). The dummy member (2330) may be so disposed as to contact the fifth magnet unit (2321). The dummy member (2330) may be so disposed as to be extended to a lengthwise direction from the fifth magnet unit (2321). A sum of a distance between both lateral surfaces of dummy member (2330) and a distance between both lateral surfaces of the fifth magnet unit (2321) may be same as a distance between both lateral surfaces of the sixth magnet unit (2322). That is, compared with the sixth magnet unit (2322), the dummy member (2330) may be formed with a size corresponding to an area omitted with the fifth magnet unit (2321). The dummy member (2330) may have a height same as that of the fifth magnet unit (2321). The dummy member (2330) may have a thickness same as that of the fifth magnet unit (2321). The dummy member (2330) may have a width same as that of the fifth magnet unit (2321). At this time, the height of the dummy member (2330) may be a length to a lengthwise direction (short side direction, vertical direction) of inner surface of dummy member (2330), and a width of the dummy member (2330) may be a length of crosswise direction (major side direction, horizontal direction) of inner surface of the dummy member (2330). The thickness of dummy member (2330) may be a distance between an inner surface and an outer surface of the dummy member (2330). In a modification, any one or more of the height, thickness and width of the dummy member (2330) may be different from those of the fifth magnet unit (2321).

The dummy member (2330) may be disposed on the fifth lateral part (2301) of the second housing (2310) to be leaned toward a corner part of the other side {a corner part of opposite side of a corner part disposed adjacently disposed by the fifth magnet (2321)}. The dummy member (2330) may be eccentrically disposed to the other side. An eccentric direction of the dummy member (2330) may be opposite to an eccentric direction of the fifth magnet unit (2321). Thus, the eccentric direction of dummy member (2330) may match the eccentric direction of the first magnet unit (1321), through which an overlapped area between the dummy member (2330) and the first magnet unit (1321) may be maximized. The said structure can minimize the magnetic field interference between the fifth magnet unit (2321) and the first magnet unit (1321).

The second lens driving device (2000) may include a second stator (2400). The second stator (2400) may be disposed underneath the second housing (2310). The second stator (2400) may be disposed underneath the second OIS mover (2300). The second stator (2400) may face the second OIS mover (2300). The second stator (2400) may movably support the second OIS mover (2300). The second stator (2400) can move the second OIS mover (2300). At this time, the second AF mover (2200) may also move along with the second OIS mover (2300).

The second stator (2400) may include a second circuit member (2410). The second circuit member (2410) may be coupled with a second support member (2600). The second circuit member (2410) can supply a current to the third coil (2220). The second circuit member (2410) can supply a current to the third coil (2220) through the second support member (2600) and the second upper elastic member (2510). The second circuit member (2410) can supply a current to a board (2720) of a third sensor unit (2700) through the second support member (2600) and the second upper elastic member (2510). The current supplied to the board (2720) may be used for driving of the third sensor (2710).

The second circuit member (2410) may include a second board (2411). The second board (2411) can supply a power to a fourth coil (2412b). The second board (2411) may be coupled with a coil member (2412). The second board (2411) may be coupled with a PCB (10) disposed underneath a second base (2420). The second board (2411) may be disposed on an upper surface of second base (2420). The second board (2411) may be disposed underneath a lower surface of the coil member (2412). The second board (2411) may be interposed between the coil member (2412) and the second base (2420). The second board (2411) may be coupled with the second support member (2600). The second board (2411) may be formed with a hole passed through by the second support member (2600). A lower surface of the second board (2411) and a lower end of the second support member (2600) may be coupled by a soldering. The second board (2411) may include an FPCB (Flexible Printed Circuit Board). The second board (2411) may be partially bent.

The second board (2411) may include a hole (2411a). The hole (2411a) may be formed on the second board (2411). The hole (2411a) may be formed at a center of the second board (2411). The hole (2411a) may be so formed as to pass through the second board (2411). The hole (2411a) may pass through a light having passed the second lens module. The hole (2411a) may be formed with a round shape.

The second board (2411) may include a terminal part (2411b). The terminal part (2411b) may be formed on the second board (2411). The terminal part (2411b) may be formed by allowing a portion of the second board (2411) to be bent downward. At least a portion of the terminal part (2411b) may be exposed to the outside. The terminal part (2411b) may be coupled with the PCB (10) disposed underneath the second base (2420) by way of soldering. A lower end of the terminal part (2411b) may be directly contacted to the PCB (10). The terminal part (2411b) may be disposed on a terminal coupling part (2424) of the second base (2420).

The second circuit member (2410) may include a coil member (2412). The coil member (2412) may be disposed on the second board (2411). Alternatively, the coil member (2412) may be disposed on the second base (2420). The coil member (2412) may be disposed on an upper surface of the second board (2411). The coil member (2412) may be disposed underneath the second magnet (2320). The coil member (2412) may be interposed between the second magnet (2320) and the second base (2420). The coil member (2412) may be coupled by the second support member (2600). The coil member (2412) may movably support the second OIS mover (2300).

The coil member (2412) may include a board part (2412a). The board part (2412a) may be a circuit board. The board part (2412a) may include an FPCB. The board part (2412a) may be integrally formed with a fourth coil (2412b). The board part (2412a) may be coupled by the second support member (2600). The board part (2412a) may be formed with a hole passed through by the second support member (2600). A lower surface of board part (2412a) and a lower end of the second support member (2600) may be coupled by way of soldering. A center of the board part (2412a) may be formed with a hole corresponding to the hole (2411a) of the second board (2411).

The coil member (2412) may include a fourth coil (2412b). The fourth coil (2412b) may face the second magnet (2320). In this case, when a current is supplied to the fourth coil (2412b) to form a magnetic field about the fourth coil (2412b), the second magnet (2320) may be moved relative to the fourth coil (2412b) in response to the electromagnetic interaction between the fourth coil (2412b) and the second magnet (2320). The fourth coil (2412b) may electromagnetically interact with the second magnet (2320). The fourth coil (2412b) may move the second housing (2310) and the second bobbin (2210) relative to the second base (2420) to a direction perpendicular to an optical axis through electromagnetic interaction with the second magnet (2320). The fourth coil (2412b) may be an FP (Fine Pattern) coil integrally formed on the board part (2412a). The fourth coil (2412b) may include a plurality of coil units, each mutually spaced apart. The fourth coil (2412b) may include four coil units, each mutually spaced apart. At this time, the said four coil units may be disposed on the board part (2412a) to allow two adjacent coil units to mutually form an 90°. Meantime, the four coil units may be separately and individually controlled. The fourth coil (2412b) may sequentially receive a power through the PCB (10), the second board (2411) and the board part (2412a).

The second stator (2400) may include a second base (2420). The second base (2420) may be disposed at a lower surface of second circuit member (2410). An upper surface of second base (2420) may be disposed with a second circuit member (2410). The second base (2420) may be coupled with the second cover (2100). The second base (2420) may be disposed on an upper surface of PCB (10). However, a separate holder member may be interposed between the second base (2420) and the PCB (10). The second base (2420) may function as a sensor holder protecting a second image sensor mounted on the PCB (10).

The second base (2420) may include a hole (2421). The hole (2421) may be formed on the second base (2420). The hole (2421) may be so formed as to vertically penetrate the second base (2420). The hole (2421) may be formed with an infrared filter. However, the infrared filter may be disposed on a separate holder member disposed at a lower surface of the second base (2420). A light having passed the second lens module through the hole (2421) may be irradiated on an image sensor. The hole (2421) may be formed with a round shape.

The second base (2420) may include a foreign object collection part (2422). The foreign object collection part (2422) may collect (capture) foreign objects introduced into the second lens driving device (2000). The foreign object collection part (2422) may include a groove formed by allowing an upper surface of the second base (2420) to be recessed and a dust trap disposed on the groove. The dust trap may possess the viscosity. The foreign objects introduced into the second lens driving device (2000) may be adhered to the dust trap.

The second base (2420) may include a sensor coupling part (2423). The sensor coupling part (2423) may be disposed with a fourth sensor (2800). The sensor coupling part (2423) may accommodate at least a portion of the fourth sensor (2800). The sensor coupling part (2423) may include a groove formed by allowing an upper surface of second base (2420) to be recessed. The sensor coupling part (2423) may be spaced apart from the foreign object collection part (2422). The sensor coupling part (2423) may include a plurality of grooves. For example, the sensor coupling part (2423) may be formed with two grooves. At this time, each of the two grooves may be disposed with a fourth sensor (2800).

The second base (2420) may include a terminal coupling part (2424). The terminal coupling part (2424) may be disposed with a terminal part (2411b) of the second board (2411). The terminal coupling part (2424) may include a groove formed by allowing a portion of one lateral surface of one side of second base (2420) to be recessed inwardly. At this time, the terminal coupling part (2424) may be accommodated by at least a portion of the terminal part (2411b) of the second board (2411). A width of terminal coupling part (2424) may be formed with a width corresponding to that of the terminal part (2411b) of the second board (2411). A length of the terminal coupling part (2424) may be so formed as to correspond to a length of the terminal part (2411b) of the second board (2411).

The second base (2420) may include a staircase part (2425). The staircase part (2425) may be formed at a lateral surface of second base (2420). The staircase part (2425) may be so formed as to circumvent an outer circumferential surface of the second base (2420). The staircase part (2425) may be formed by allowing an upper surface of a lateral surface of second base (2420) to be recessed. Alternatively, the staircase part (2425) may be formed by allowing a lower surface of a lateral surface of the second base (2420) to be protruded. The staircase part (2425) may be disposed with a lower end of the side plate (2120) of the second cover (2100).

The second lens driving device (2000) may include a second elastic member (2500). The second elastic member (2500) may be coupled to the second bobbin (2210) and the second housing (2310). The second elastic member (2500) may elastically support the second bobbin (2210). At least a portion of the second elastic member (2500) may possess the elasticity. The second elastic member (2500) may movably support the second bobbin (2210). The second elastic member (2500) may movably support the second bobbin (2210) to allow the second bobbin (2210) to move relative to the second housing (2310) to an optical axis direction. That is, the second elastic member (2500) may support the second bobbin (2210) for AF driving. At this time, the second elastic member (2500) may be called an 'AF elastic member'.

The second elastic member (2500) may include a second upper elastic member (2510). The second upper elastic member (2510) may be disposed on an upper side of the second bobbin (2210) and may be coupled with the second bobbin (2210) and the second housing (2310). The second upper elastic member (2510) may be disposed at an upper side or an upper surface of second bobbin (2210), and at an upper side or an upper surface of the second housing (2310). The second upper elastic member (2510) may elastically support the second bobbin (2210). The second upper elastic member (2510) may possess the elasticity on at least a portion thereof. The second upper elastic member (2510) may movably support the second bobbin (2210). The second upper elastic member (2510) may movably move the second bobbin (2210) relative to the second housing (2310) to an optical axis direction. The second upper elastic member (2510) may be formed with a leaf spring.

The second upper elastic member (2510) may be formed with a plurality of dividable elements. The second upper elastic member (2510) may include six (6) upper elastic units (2501, 2502, 2503, 2504, 2505, 2506), each mutually spaced apart. The first to sixth upper elastic units (2501, 2502, 2503, 2504, 2505, 2506) may be mutually spaced apart, through which the first to sixth upper elastic units (2501, 2502, 2503, 2504, 2505, 2506) may be used as conductive lines inside the second lens driving device (2000). The first to sixth upper elastic units (2501, 2502, 2503, 2504, 2505, 2506) may be electrically connected to the second circuit member (2410) through the second support member (2600). The first to sixth upper elastic units (2501, 2502, 2503, 2504, 2505, 2506) may be coupled to a board (2720) of the third sensor unit (2700), through which the first to sixth upper elastic units (2501, 2502, 2503, 2504, 2505, 2506) may be electrically connected to a third sensor (2710). At this time, the fifth and the sixth upper elastic units (2505, 2506) may be electrically connected to the third coil (2220). That is, the first to sixth upper elastic units (2501, 2502, 2503, 2504, 2505, 2506) may be used to supply a power to the third sensor (2710) disposed on the second housing (2310) and the third coil (2220) disposed on the second bobbin (2210).

The second upper elastic member (2510) may include an external part (2511). The external part (2511) may be coupled to the second housing (2310). The external part (2511) may be coupled to an upper side or an upper surface of the second housing (2310). The external part (2511) may be coupled to an upper coupling part (2313) of the second housing (2310). The external part (2511) may include a groove or a hole coupled to the upper coupling part (2313) of the second housing (2310).

The second upper elastic member (2510) may include an internal part (2512). The internal part (2512) may be coupled to the second bobbin (2210). The internal part (2512) may be coupled to an upper side or an upper surface of second bobbin (2210). The internal part (2512) may be coupled to an upper coupling part (2213) of the second bobbin (2210). The internal part (2512) may include a groove or a hole coupled with the upper coupling part (2213) of the second bobbin (2210).

The second upper elastic member (2510) may include a connection part (2513). The connection part (2513) may connect the external part (2511) and the internal part (2512). The connection part (2513) may elastically connect the external part (2511) and the internal part (2512). The connection part (2513) may possess the elasticity. At this time, the connection part (2513) may be called an 'elastic part'. The connection part (2513) may be formed by being bent more than twice.

The second upper elastic member (2510) may include a coupling part (2514). The coupling part (2514) may be coupled with the second support member (2600). The coupling part (2514) may be coupled to the second support member (2600) by way of soldering. For example, the coupling part (2514) may include a hole passed by the second support member (2600). In another example, the coupling part (2514) may include a groove coupled by the second support member (2600). The coupling part (2514) may be extended from the external part (2511). The coupling part (2514) may include a bent part formed by being bent.

The second upper elastic member (2510) may include a terminal part (2515). The terminal part (2515) may be extended from the external part (2511). The terminal part (2515) may be electrically connected to a board (2720) of the second sensor unit (2700). The terminal part (2515) may be coupled to a terminal of the board (2720) of the second sensor unit (2700) by way of soldering. The terminal part (2515) may include a total of four (4) pieces.

The second elastic member (2500) may include a second lower elastic member (2520). The second lower elastic member (2520) may be disposed at a lower side of the second bobbin (2210), and may be coupled to the second bobbin (2210) and the second housing (2310). The second lower elastic member (2520) may be coupled to the second bobbin (2210) and the second housing (2310). The second lower elastic member (2520) may be coupled to a lower side or a lower surface of the second bobbin (2210) and may be coupled to a lower side or a lower surface of the second housing (2310). The second lower elastic member (2520)

may elastically support the second bobbin (2210). At least a portion of the second lower elastic member (2520) may possess the elasticity. The second lower elastic member (2520) may movably support the second bobbin (2210). The second lower elastic member (2520) may movably support the second bobbin (2210) relative to the second housing (2310) to an optical axis direction. The second lower elastic member (2520) may be formed with a leaf spring. For example, the second lower elastic member (2520) may be integrally formed.

The second lower elastic member (2520) may include an external part (2521). The external part (2521) may be coupled to the second housing (2310). The external part (2521) may be coupled to an upper side or an upper surface of the second housing (2310). The external part (2521) may be coupled to a lower coupling part of the second housing (2310). The external part (2521) may include a groove or a hole coupled to the lower coupling part of the second housing (2310).

The second lower elastic member (2520) may include an internal part (2522). The internal part (2522) may be coupled to the second bobbin (2210). The internal part (2522) may be coupled to an upper side or an upper surface of second bobbin (2210). The internal part (2522) may be coupled to a lower coupling part of second bobbin (2210). The internal part (2522) may include a groove or a hole coupled with the lower coupling part of second bobbin (2210). The second lower elastic member (2520) may include a connection part (2523). The connection part (2523) may connect the external part (2521) and the internal part (2522). The connection part (2523) may elastically connect the external part (2521) and the internal part (2522). The connection part (2523) may possess the elasticity. At this time, the connection part (2523) may be called an 'elastic part'. The connection part (2523) may be formed by being bent more than twice.

The second lens driving device (2000) may include a second support member (2600). The second support member (2600) may movably support the second housing (2310). The second support member (2600) may elastically support the second housing (2310). At least a portion of the second support member (2600) may possess the elasticity. At this time, the second support member (2600) may be called an 'elastic member'. For example, the second support member (2600) may movably support the second housing (2310) relative to the second stator (2400) to a direction perpendicular to an optical axis. At this time, the second bobbin (2210) may be integrally moved along with the second housing (2310). In another example, the second support member (2600) may tiltably support the second housing (2310) relative to the second stator (2400). That is, the second support member (2600) may support the second housing (2310) and the second bobbin (2210) so that the second housing (2310) and the second bobbin (2210) can be driven for OIS operation. At this time, the second support member (2600) may be called an 'OIS support member'. For example, the second support member (2600) may be formed with a wire. In another example, the second support member (2600) may be formed with a leaf spring.

The second support member (2600) may be coupled to the second upper elastic member (2510) and the second stator (2400). A lower end of the second support member (2600) may be coupled to a second circuit board (2410). A lower end of the second support member (2600) may be coupled to a second board (2411). A lower end of the second support member (2600) may be coupled to a coil member (2412). The second support member (2600) may pass through the second board (2411). Through the said structure, a lower end of the second support member (2600) may be coupled to a lower surface of the second board (2411) by way of soldering. An upper end of the second support member (2600) may be coupled to a coupling part (2514) of the second upper elastic member (2510). The upper end of the second support member (2600) may pass through the coupling part (2514) of the second upper elastic member (2510). In the said structure, the upper end of the second support member (2600) may be coupled to an upper surface of the coupling part (2514) of the second upper elastic member (2510) by way of soldering.

The second support member (2600) may include six (6) support parts (2601, 2602, 2603, 2604, 2605, 2606), each mutually spaced apart. The second support member (2600) may be formed with first to sixth support parts (2601, 2602, 2603, 2604, 2605, 2606) to pair with the first to sixth upper elastic units (2501, 2502, 2503, 2504, 2505, 2506) of the second upper elastic member (2510). In a modification, the second support member (2600) may be formed with eight (8) support parts in consideration of symmetry.

The first to sixth support parts (2601, 2602, 2603, 2604, 2605, 2606) may be mutually spaced apart, through which the first to sixth support parts (2601, 2602, 2603, 2604, 2605, 2606) may be used as conductive lines inside the second lens driving device (2000). The first to sixth support parts (2601, 2602, 2603, 2604, 2605, 2606) may be coupled with the second circuit member (2410). The first to sixth support parts (2601, 2602, 2603, 2604, 2605, 2606) may be coupled with the second upper elastic member (2510). That is, the first to sixth support parts (2601, 2602, 2603, 2604, 2605, 2606) may electrically connect the second circuit member (2410) with the second upper elastic member (2510). The second support part (2601) may be coupled to the first upper elastic unit (2501), the second support part (2602) may be coupled to the second upper elastic unit (2502), the third support part (2603) may be coupled to the third upper elastic unit (2503), the fourth support part (2604) may be coupled to the fourth upper elastic unit (2504), the fifth support part (2605) may be coupled to the fifth upper elastic unit (2505), and the sixth support part (2606) may be coupled to the sixth upper elastic unit (2506). The first to sixth support parts (2601, 2602, 2603, 2604, 2605, 2606) may be respectively wires.

The second lens driving device (2000) may include a damper (not shown). The damper may be disposed on the second support member (2600). The damper may be disposed on the second support member (2600) and the second housing (2310). The damper may be disposed on the second elastic member (2500). The damper may be disposed on the second elastic member (2500) and/or on the second support member (2600) to inhibit the resonant phenomenon generated from the second elastic member (2500) and/or the second support member (2600).

The second lens driving device (2000) may include a third sensor unit (2700). The third sensor unit (2700) may be provided for AF feedback. The third sensor unit (2700) may detect the movement of the second bobbin (2210) to an optical axis direction. The third sensor unit (2700) may detect an amount of movement of the second bobbin (2210) to an optical axis direction and provide the amount of movement to a controller in real time.

The third sensor unit (2700) may include a third sensor (2710). The third sensor (2710) may be disposed on the second housing (2310). The third sensor (2710) may be disposed on a corner part of the second housing (2310). The third sensor (2710) may be interposed between fifth and seventh lateral parts (2301, 2303). The third sensor (2710)

may be disposed on a board (2720). The third sensor (2710) may be electrically connected to the board (2720). The third sensor (2710) may be coupled to the board (2720) by way of SMT (Surface Mounting Technology) method. The third sensor (2710) may detect a second sensing magnet (2730). The third sensor (2710) may include a Hall IC (Hall IC) detecting the magnetic field of a magnet. The third sensor (2710) may include a Hall-integrated driver. The third sensor (2710) may include a temperature detecting function. The third sensor (2710) may be fixed to the second housing (2310), and the second sensing magnet (2730) may be fixed to the second bobbin (2210). When the second sensing magnet (2730) moves along with the second bobbin (2210), the magnetic flux density detected by the Hall sensor inside the third sensor (2710) may be changed in response to a relative position of the third sensor (2710) and the second sensing magnet (2730). The third sensor (2710) may detect the position of the second lens module using an output voltage of the Hall device proportion to the magnetic flux density that changes in response to the relative position of the third sensor (2710) and the second sensing magnet (2730).

The third sensor unit (2700) may include a board (2720). The board (2720) may be disposed on the second housing (2310). The board (2720) may be coupled with the third sensor (2710). The board (2720) may be coupled with the second upper elastic member (2510). The board (2720) may include four terminals coupled with the first to fourth upper elastic units (2501, 2502, 2503, 2504) of the second upper elastic member (2510). The board (2720) and the second upper elastic member may be coupled by way of soldering. An upper surface of board (21720) may be coupled with the first to fourth upper elastic units (2501, 2502, 2503, 2504) of the second upper elastic member (2510) and a lower surface of the board (2720) may be coupled with the third sensor (2710).

The third sensor unit (2700) may include a second sensing magnet (2730). The second sensing magnet (2730) may be disposed on a lateral surface of the second bobbin (2210) facing the corner part between the fifth and seventh lateral parts (2301, 2303) of the second housing (2310). The second sending magnet (2730) may be disposed on the second bobbin (2210). The second sending magnet (2730) may be detected by the third sensor (2710). The second sensing magnet (2730) may face the third sensor (2710). The second sensing magnet (2730) may be disposed on a third coil (2220). The second sensing magnet (2730) may be brought into contact with the third coil (2220). In a modification, a portion of the second bobbin (2210) may be interposed between the second sensing magnet (2730) and the third coil (2220). An upper surface of second sensing magnet (2730) may be disposed at a higher level than an upper surface of the third sensor (2710). A lower surface of the second sensing magnet (2730) may be disposed at a lower level than a lower surface of the third sensor (2710).

The third sensor unit (2700) may include a second compensation magnet (2740). However, the second compensation magnet (2740) may be understood as a separate element from the third sensor unit (2700). The second compensation magnet (2740) may be so disposed as to maintain a magnetic balance with the second sensing magnet (2730). The second compensation magnet (2740) may be disposed on the second bobbin (2210). The second compensation magnet (2740) may be symmetrical with the second sensing magnet (2730) about a center axis of the second bobbin (2210). The second compensation magnet (2740) may have a magnetism corresponding to that of the second sensing magnet (2730).

The second lens driving device (2000) may include a fourth sensor (2800). The fourth sensor (2800) may be provided for OIS feedback. The fourth sensor (2800) may detect the movement of second housing (2310). The fourth sensor (2800) may detect the movement or tilt of the second housing (2310) and/or the second bobbin (2210) to a direction perpendicular to an optical axis. The fourth sensor (2800) may detect the second magnet (2320). The fourth sensor (2800) may be disposed on the second stator (2400). The fourth sensor (2800) may be disposed at a lower surface of second board (2411). The fourth sensor (2800) may be electrically connected to the second board (2411). The fourth sensor (2800) may be disposed on the second base (2420). The fourth sensor (2800) may be a Hall sensor. The fourth sensor (2800) may be a Hall IC (Hall integrated circuit). The fourth sensor (2800) may detect the magnetic force of the second magnet (2320). That is, the fourth sensor (2800) may detect a displacement amount of the second housing (2310) by detecting the changes in the magnetic force that is changed by the movement of the second magnet (2320) when the second housing (2310) is moved. The fourth sensor (2800) may be provided in a plural number. The fourth sensor (2800) may include a first axis sensor (2810) and a second axis sensor (2820). At this time, the first axis sensor (2810) may detect the x axis movement (optical axis is z axis) of the second housing (2310) and the second axis sensor (2820) may detect the y axis movement of the second housing (2310).

Hereinafter, configuration of camera module according to a modification (second exemplary embodiment) will be described with reference to the accompanying drawings.

Figure 18:
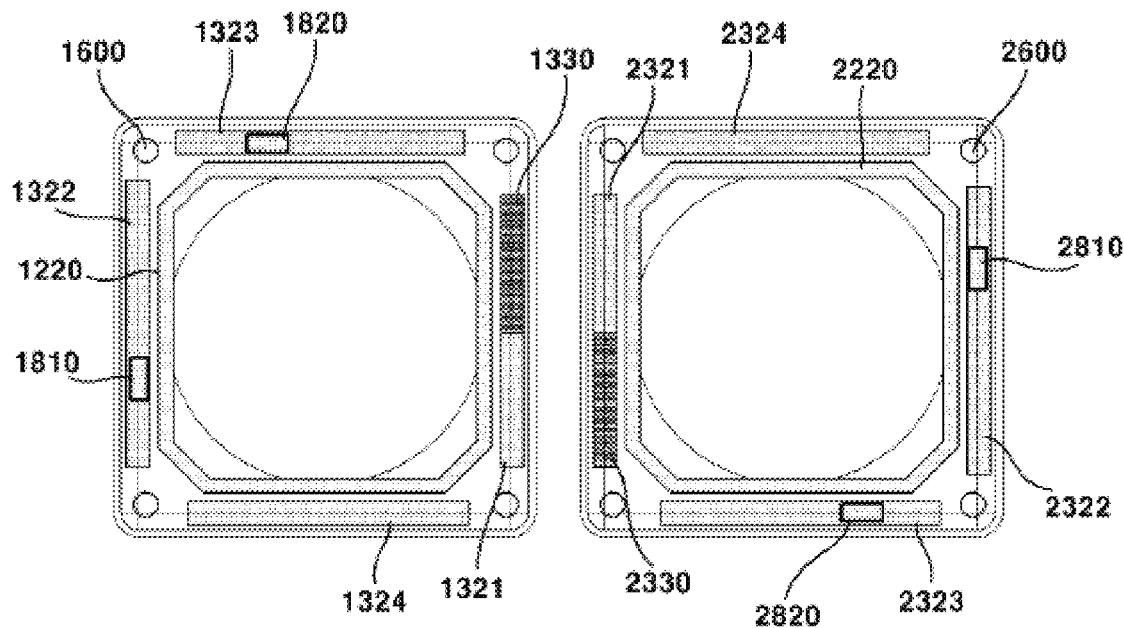
FIG. 18 is a perspective (conceptual) view of some elements of a dual camera module seen from a plane according to a modification.

FIG. 18 is a perspective (conceptual) view of some elements of a dual camera module seen from a plane according to a modification.

The camera module according to the modification (the second exemplary embodiment) may have a configuration omitted with the first sensor unit (1700) and the third sensor unit (2700) compared with that of the exemplary embodiment (first exemplary embodiment). To be more specific, as illustrated in FIG. 18, the camera module according to the modification (the second exemplary embodiment) may have a configuration omitted with the first sensor (1710), the first sending magnet (1730), the first compensation magnet (1740), the third sensor (2710), the second sensing magnet (2730) and the second compensation magnet (2740).

The camera module according to the second exemplary embodiment may include a cover (1100, 2100), an AF mover (1200, 2200), an OIS mover (1300, 2300), a stator (1400, 2400), an elastic member (1500, 2500), a support member (1600, 2600), a second sensor (1800) and a fourth sensor (2800). The description of the cover (1100, 2100), the AF mover (1200, 2200), the OIS mover (1300, 2300), the stator (1400, 2400), the elastic member (1500, 2500), the support member (1600, 2600), the second sensor (1800) and the fourth sensor (2800) according to the second exemplary embodiment may be inferably applied from the camera module of the previous first exemplary embodiment.

Hereinafter, configuration of a camera module according to another modification (third exemplary embodiment) will be described.

Figure 19:
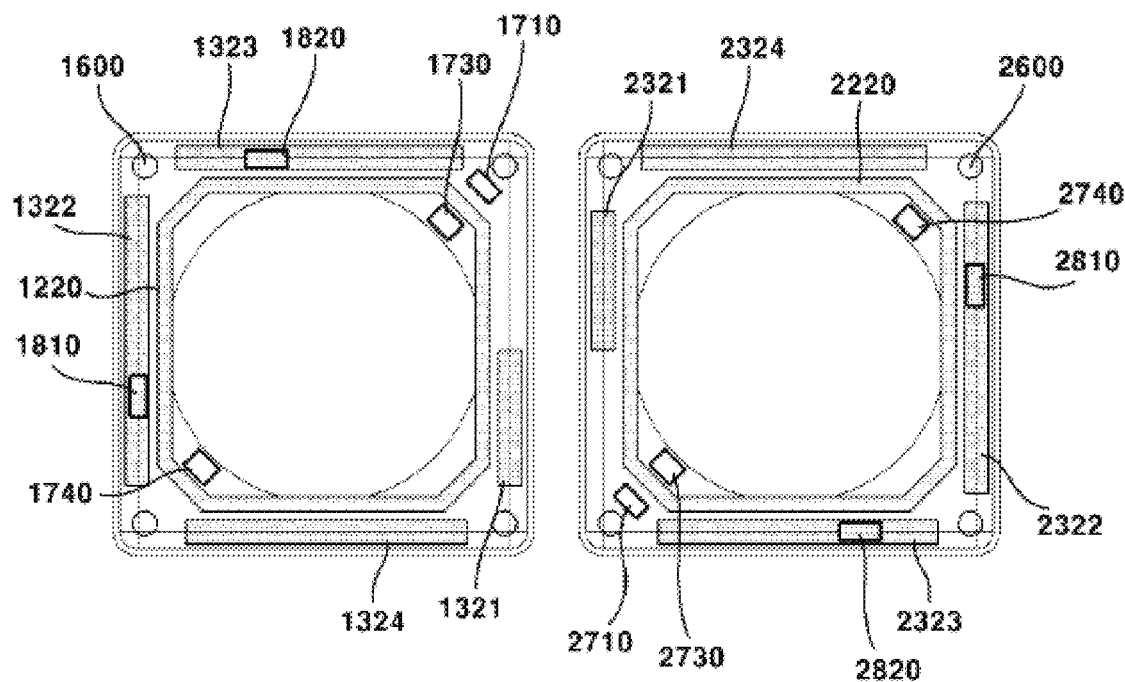
FIG. 19 is a perspective (conceptual) view of some elements of a dual camera module seen from a plane according to another modification.

FIG. 19 is a perspective (conceptual) view of some elements of a dual camera module seen from a plane according to another modification.

The camera module according to another modification (third exemplary embodiment) may have a structure omitted with a dummy member (1330, 2300) compared with that of the previous exemplary embodiment (first exemplary embodiment). To be more specific, the camera module according to another modification (third exemplary embodiment) may have a structure omitted with the dummy member (1330) of the first lens driving device (1000) and the dummy member (2300) of the second lens driving device (2000), as illustrated in FIG. 19.

The camera module according to the third exemplary embodiment may include a cover (1100, 2100), an AF mover (1200, 2200), an OIS mover (1300, 2300), a stator (1400, 2400), an elastic member (1500, 2500), a support member (1600, 2600), a first sensor unit (1700), a second sensor (1800), a third sensor unit (2700) and a fourth sensor (2800). The description of the cover (1100, 2100), the AF mover (1200, 2200), the OIS mover (1300, 2300), the stator (1400, 2400), the elastic member (1500, 2500), the support member (1600, 2600), the first sensor unit (1700), the second sensor (1800), the third sensor unit (2700) and the fourth sensor (2800) according to the camera module of the third exemplary embodiment may be inferably explained from that of the previous first exemplary embodiment.

Hereinafter, configuration of a camera module according to still another modification (fourth exemplary embodiment) will be described.

Figure 20:
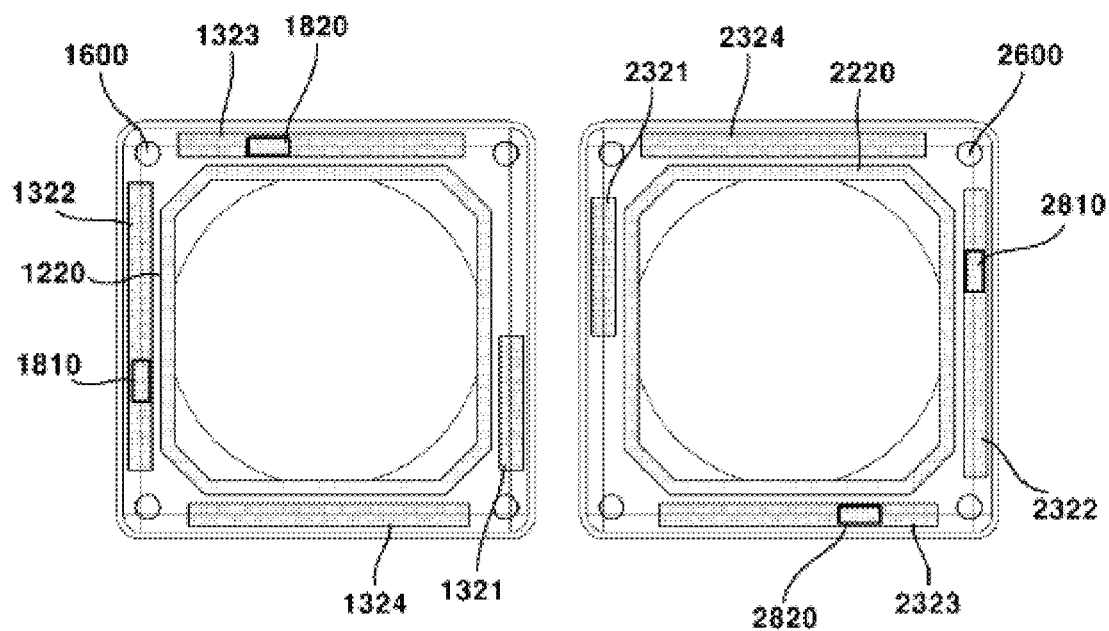
FIG. 20 is a perspective (conceptual) view of some elements of a dual camera module seen from a plane according to still another modification.

FIG. 20 is a perspective (conceptual) view of some elements of a dual camera module seen from a plane according to still another modification.

The camera module according to still another modification (fourth exemplary embodiment) may have a structure omitted with a dummy member (1330, 2300) compared with that of the second exemplary embodiment. To be more specific, the camera module according to another modification (fourth exemplary embodiment) may have a structure omitted with the dummy member (1330) of the first lens driving device (1000) and the dummy member (2300) of the second lens driving device (2000), as illustrated in FIG. 20.

The camera module according to the fourth exemplary embodiment may include a cover (1100, 2100), an AF mover (1200, 2200), an OIS mover (1300, 2300), a stator (1400, 2400), an elastic member (1500, 2500), a support member (1600, 2600), a second sensor (1800), and a fourth sensor (2800).

The description of the cover (1100, 2100), the AF mover (1200, 2200), the OIS mover (1300, 2300), the stator (1400, 2400), the elastic member (1500, 2500), the support member (1600, 2600), the first sensor unit (1700), the second sensor (1800), and the fourth sensor (2800) according to the camera module of the fourth exemplary embodiment may be inferably explained from that of the previous first exemplary embodiment.

The object of the present exemplary embodiment is to improve the characteristics of a camera module by maintaining a minimum gap among products through an electromechanical optimization (magnetic field-interference avoidance) design in order to solve a phenomenon in which electromagnetic field interference is generated among products when a dual OIS camera is applied to thereby affect other products. At this time, the aforementioned characteristics of camera module may be zoom characteristics and the like of the camera module. To be more specific, in order to utilize a zoom function and the like, a distance between products must be close. Particularly, the distance of 1 mm gap is required. However, in order to make the distance between products closer, there is generated a problem of reducing the electromagnetic force involved from the magnetic field interference.

In the exemplary embodiments, the electromagnetic force is made to be maximized, while the electromagnetic force of X, Y axes are made to be equal to thereby remove the tilt, and to minimize the electromagnetic field interference among products. In the exemplary embodiments, a sensing magnet and a compensation magnet can be arranged on a symmetrical direction when a CLAF (close loop auto focus) is added. Furthermore, an OIS Hall IC may be overlapped on a portion of a magnet or on an entire of the magnet. Alternatively, an OIS Hall IC may be overlapped on a portion of a magnet or on an entire of the magnet during driving. The OIS Hall IC may be arranged on a same position as the first lens driving device and the second lens driving device, or may be arranged on a diagonal direction. In the exemplary embodiments, the first lens driving device and the second lens driving device may be individually realized. In the exemplary embodiments, the configuration may be so arranged as to minimize the phenomenon in which the Hall IC affects the electromagnetic fields of other products by disposing the position elements as illustrated in FIGS. 17 to 20. In the exemplary embodiments, the position detection elements such as the Hall ICs may include a Hall integrated driver. The Hall IC and the sensing magnet may be mutually changeable in positions thereof. The Hall IC may be disposed on the bobbin or on the housing. The Hall IC may be disposed in one piece or more than one piece to determine or correct a tilt value. The Hall IC may be also used for temperature sensing function.

The present invention by way of the exemplary embodiments relates to a VCM (voice coil motor), a camera module and a mobile phone configured to reduce the size of a portion of a driving magnet in the OIS & OIS dual camera and to maintain a minimum distance between the two. The present invention by way of the exemplary embodiments relates to a structure in which the sensing magnets are diagonally arranged and the driving magnet between products is maximally maintained in distance. The present invention by way of the exemplary embodiments relates to a camera module in which the actuator structures (magnet arrangement relationship, position element disposition relationship, coil arrangement relationship) of a dual camera are same. The OIS Hall IC may be so configured as to overlap with a portion or an entire of a magnet. The OIS Hall IC included while being driven may be so configured as to overlap with a portion or an entire of a magnet. In case of CLAF, the AF Hall IC may be diagonally disposed and the OIS Hall IC may be disposed on a straight line part.

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention. Furthermore, terms such as "includes", "including", "have", "having", "comprises" and/or "comprising" as used herein mean that the relevant elements are embedded, unless otherwise described, such that the mentioned elements are not excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being included in the scope of right of the present invention.

The invention claimed is:

1. A camera module comprising:
a first lens driving device comprising a first housing, a first bobbin disposed in the first housing, a first coil disposed on the first bobbin, a first circuit member comprising a second coil and spaced apart from the first housing, and a first magnet disposed on the first housing and facing the second coil; and
a second lens driving device comprising a second housing, a second bobbin disposed in the second housing, a third coil disposed on the second bobbin, a second magnet disposed on the second housing and facing the third coil, and a second circuit member comprising a fourth coil facing the second magnet and spaced apart from the second housing,
wherein a first lateral surface of the first lens driving device faces a second lateral surface of the second lens driving device,
wherein the first housing comprises a first lateral part corresponding to the first lateral surface of the first lens driving device and a second lateral part opposite to the first lateral part,
wherein the first magnet comprises a first magnet unit disposed in the first lateral part and a second magnet unit disposed in the second lateral part,
wherein each of the first magnet unit and the second magnet unit comprises an inner surface facing the first coil, an outer surface opposite to the inner surface, and a pair of lateral surfaces spaced apart in a direction perpendicular to an optical axis of the first lens driving device and connecting the inner surface and the outer surface, and
wherein a distance between the pair of lateral surfaces of the first magnet unit is shorter than a distance between the pair of lateral surfaces of the second magnet unit.

2. The camera module of claim 1, wherein the first lateral part of the first housing is disposed with a dummy member having magnetism weaker than that of the first magnet unit or having non-magnetism.

3. The camera module of claim 2, wherein a sum of a distance between a pair of lateral surfaces of the dummy member and a distance between the pair of lateral surfaces of the first magnet unit is same as a distance between the pair of lateral surfaces of the second magnet unit.

4. The camera module of claim 2, wherein a sum of a mass of the dummy member and a mass of the first magnet unit is same as a mass of the second magnet unit.

5. The camera module of claim 1, wherein the first housing comprises a third lateral part and a fourth lateral part disposed between the first lateral part and the second lateral part, each mutually disposed opposite to the other, wherein the first magnet comprises a third magnet unit disposed on the third lateral part and a fourth magnet unit disposed on the fourth lateral part,
wherein the third magnet unit comprises an inner surface facing the first coil, an outer surface opposite to the inner surface of the third magnet unit, and a pair of lateral surfaces connecting the inner surface of the third magnet unit and the outer surface of the third magnet unit,
wherein the fourth magnet unit comprises an inner surface facing the first coil, an outer surface opposite to the inner surface of the fourth magnet unit, and a pair of lateral surfaces connecting the inner surface of the fourth magnet unit and the outer surface of the fourth magnet unit, and
wherein a distance between the pair of lateral surfaces of the third magnet unit is same as a distance between the pair of lateral surfaces of the fourth second magnet unit.

6. The camera module of claim 5, wherein the first lens driving device comprises a third magnet disposed on the first bobbin, and a first sensor disposed on the first housing and facing the third magnet,
wherein the first sensor is disposed between the first lateral part of the first housing and the third lateral part of the first housing, and
wherein the first magnet unit disposed on the first lateral part of the first housing is more eccentric toward the fourth lateral part of the first housing than to the third lateral part of the first housing.

7. The camera module of claim 1, wherein the second housing comprises a fifth lateral part corresponding to the second lateral surface of the second lens driving device and a sixth lateral part opposite to the fifth lateral part,
wherein the second magnet comprises a fifth magnet unit disposed on the fifth lateral part and a sixth magnet unit disposed on the sixth lateral part,
wherein the fifth magnet unit comprises an inner surface facing the third coil, an outer surface opposite to the inner surface of the fifth magnet unit, and a pair of lateral surfaces connecting the inner surface of the fifth magnet unit and the outer surface of the fifth magnet unit,
wherein the sixth magnet unit comprises an inner surface facing the third coil, an outer surface opposite to the inner surface of the sixth magnet unit, and a pair of lateral surfaces connecting the inner surface of the sixth magnet unit and the outer surface of the sixth magnet unit, and
wherein a distance between the pair of lateral surfaces of the fifth magnet unit is shorter than a distance between the pair of lateral surfaces of the sixth second magnet unit.

8. The camera module of claim 7, wherein the first magnet unit and the fifth magnet unit are formed with a plate shape and mutually disposed in parallel, and
wherein the first magnet unit comprises an area non-overlapped with the fifth magnet unit toward a direction facing an optical axis of the second lens driving device from an optical axis of the first lens driving device.

9. The camera module of claim 7, wherein the first magnet unit is eccentrically disposed toward one side from the first lateral part of the first housing, and the fifth magnet unit is eccentrically disposed toward a direction opposite to the eccentric direction of the first magnet unit from the fifth lateral part of the second housing.

10. The camera module of claim 1, wherein a volume of the first magnet unit is smaller than a volume of the second magnet unit.

11. A camera module comprising:
a first lens driving device comprising a first housing, a first bobbin disposed in the first housing, a first coil disposed on the first bobbin, a first circuit member comprising a second coil and spaced apart from the first housing, and a first magnet disposed on the first housing and facing the second coil; and
a second lens driving device comprising a second housing, a second bobbin disposed in the second housing, a third coil disposed on the second bobbin, a second magnet disposed on the second housing and facing the third coil, and a second circuit member comprising a fourth coil facing the second magnet and spaced apart from the second housing,
wherein a first lateral surface of the first lens driving device faces a second lateral surface of the second lens driving device,
wherein the first housing comprises a first lateral part corresponding to the first lateral surface of the first lens driving device and a second lateral part opposite to the first lateral part,
wherein the first magnet comprises a first magnet unit disposed in the first lateral part and a second magnet unit disposed in the second lateral part,
wherein the first magnet unit comprises an area non-overlapped with the second magnet toward a direction facing an optical axis of the second lens driving device from an optical axis of the first lens driving device.

12. The camera module of claim 11, wherein the first lateral part of the first housing is disposed with a dummy member having magnetism weaker than that of the first magnet unit or having non-magnetism.

13. The camera module of claim 12, wherein a sum of a distance between a pair of lateral surfaces of the dummy member and a distance between a pair of lateral surfaces of the first magnet unit is same as a distance between a pair of lateral surfaces of the second magnet unit.

14. The camera module of claim 12, wherein a sum of a mass of the dummy member and a mass of the first magnet unit is same as a mass of the second magnet unit.

15. The camera module of claim 11, wherein the first housing comprises a third lateral part and a fourth lateral part disposed between the first lateral part and the second lateral part, each mutually disposed opposite to the other,
wherein the first magnet comprises a third magnet unit disposed on the third lateral part and a fourth magnet unit disposed on the fourth lateral part,
wherein the third magnet unit comprises an inner surface facing the first coil, an outer surface opposite to the inner surface of the third magnet unit, and a pair of lateral surfaces connecting the inner surface of the third magnet unit and the outer surface of the third magnet unit,
wherein the fourth magnet unit comprises an inner surface facing the first coil, an outer surface opposite to the inner surface of the fourth magnet unit, and a pair of lateral surfaces connecting the inner surface of the fourth magnet unit and the outer surface of the fourth magnet unit, and
wherein a distance between the pair of lateral surfaces of the third magnet unit is same as a distance between the pair of lateral surfaces of the fourth second magnet unit.

16. The camera module of claim 15, wherein the first lens driving device comprises a third magnet disposed on the first bobbin, and a first sensor disposed on the first housing and facing the third magnet,
wherein the first sensor is disposed between the first lateral part of the first housing and the third lateral part of the first housing, and
wherein the first magnet unit disposed on the first lateral part of the first housing is more eccentric toward the fourth lateral part of the first housing than to the third lateral part of the first housing.

17. The camera module of claim 11, wherein the second housing comprises a fifth lateral part corresponding to the second lateral surface of the second lens driving device, a sixth lateral part opposite to the fifth lateral part, and a seventh lateral part and a eighth lateral part disposed between the fifth lateral part and the sixth lateral part, each mutually disposed opposite to the other,
wherein the second magnet comprises a seventh magnet unit disposed on the seventh lateral part and a eighth magnet unit disposed on the eighth lateral part.

18. The camera module of claim 17, wherein a volume of the seventh magnet unit is same as a volume of the eighth magnet unit.

19. The camera module of claim 11, wherein each of the first magnet unit and the second magnet unit comprises an inner surface facing the first coil, an outer surface opposite to the inner surface, and a pair of lateral surfaces spaced apart in a direction perpendicular to an optical axis of the first lens driving device and connecting the inner surface and the outer surface,
wherein a distance between the pair of lateral surfaces of the first magnet unit is shorter than a distance between the pair of lateral surfaces of the second magnet unit.

20. The camera module of claim 11, wherein a volume of the first magnet unit is smaller than a volume of the second magnet unit.

* * * * *